United States Patent
Nelson et al.

(10) Patent No.: US 6,928,108 B2
(45) Date of Patent: Aug. 9, 2005

(54) MODEM WITH FIRMWARE UPGRADE FEATURE

(75) Inventors: Craig A. Nelson, St. Paul, MN (US); Harinarayana Arimilli, Coon Rapids, MN (US); Richard David Johnson, Maplewood, MN (US)

(73) Assignee: Multi-Tech Systems, Inc., Mounds View, MN (US)

( * ) Notice: Subject to any disclaimer, the term of this patent is extended or adjusted under 35 U.S.C. 154(b) by 839 days.

(21) Appl. No.: 09/975,529

(22) Filed: Oct. 10, 2001

(65) Prior Publication Data

US 2002/0114384 A1 Aug. 22, 2002

Related U.S. Application Data

(63) Continuation of application No. 08/368,291, filed on Jan. 3, 1995, now Pat. No. 6,341,143, which is a continuation-in-part of application No. 08/087,164, filed on Jul. 2, 1993, now Pat. No. 6,031,867.

(51) Int. Cl.[7] ............................. H04B 1/38; G06F 9/44
(52) U.S. Cl. ...................................... 375/222; 717/172
(58) Field of Search .............................. 375/222, 219; 717/168, 171, 172, 173, 170

(56) References Cited

U.S. PATENT DOCUMENTS

| | | | |
|---|---|---|---|
| RE30,187 E | 1/1980 | Hong et al. ............... | 371/37 |
| 4,203,006 A | 5/1980 | Mascia ..................... | 179/2 |
| 4,592,069 A | 5/1986 | Redding ................... | 375/8 |
| 4,725,977 A | 2/1988 | Izumi et al. .............. | 364/900 |
| 4,782,462 A | 11/1988 | Kaplinsky et al. ....... | 364/900 |

(Continued)

OTHER PUBLICATIONS

"AT&T Microelectronics T7540 Digital Telephone CODEC Preliminary Data Sheet", 1–64, published in Jan. 1991,.
"AT&T Microelectronics, High Speed Data Pump Chip Sets", published in Dec. 1991,.

(Continued)

Primary Examiner—Madeleine Nguyen
(74) Attorney, Agent, or Firm—Schwegman, Lundberg, Woessner & Kluth, P.A.

(57) ABSTRACT

Updated operating code and parameters can be reprogrammed into a modem system with no disassembly of the modem hardware. The modem system includes a memory chip in which operating code and parameters are stored. Two control programs control the reprogramming of updated operating code. One of the control programs is designed for manufacturing and testing purposes. The other control program allows remote reprogramming of updated operating code or parameters from a remote location such as a customer site. A user can thus remotely upgrade system firmware with updates, bug fixes, enhancements or other new releases of system operating code by downloading the update over a phone line to a host PC and reprogramming the memory chip of the modem over the serial port from the host PC. The user can also remotely upgrade the modem system firmware by directly programming the memory chip of the modem without the assistance of the host PC. The modem system is portable, obtaining power from a standard 9 volt battery. Therefore, various power saving features are also incorporated into the modem system.

21 Claims, 28 Drawing Sheets

U.S. PATENT DOCUMENTS

| | | | | |
|---|---|---|---|---|
| 4,830,757 A | | 5/1989 | Lynch et al. | 210/742 |
| 4,893,271 A | | 1/1990 | Davis et al. | 395/750 |
| 4,903,263 A | * | 2/1990 | Patel et al. | 370/259 |
| 4,982,430 A | * | 1/1991 | Frezza et al. | 380/211 |
| 5,001,729 A | | 3/1991 | Tjahjadi et al. | 375/106 |
| 5,132,716 A | | 7/1992 | Samuels et al. | 354/322 |
| 5,155,847 A | | 10/1992 | Kirouac et al. | 395/600 |
| 5,175,845 A | | 12/1992 | Little | 395/550 |
| 5,237,610 A | * | 8/1993 | Gammie et al. | 380/228 |
| 5,239,652 A | | 8/1993 | Seibert et al. | 395/750 |
| 5,268,928 A | | 12/1993 | Herh et al. | 375/8 |
| 5,293,376 A | | 3/1994 | White | 370/54 |
| 5,301,122 A | | 4/1994 | Halpern | 364/483 |
| 5,305,196 A | | 4/1994 | Deaton et al. | 364/401 |
| 5,337,044 A | | 8/1994 | Folger et al. | 340/825 |
| 5,367,670 A | | 11/1994 | Ward et al. | 395/575 |
| 5,390,350 A | | 2/1995 | Chung et al. | 395/150 |
| 5,408,522 A | | 4/1995 | Ikehata et al. | 379/98 |
| 5,425,051 A | * | 6/1995 | Mahany | 375/132 |
| 5,428,790 A | | 6/1995 | Harper et al. | 395/750 |
| 5,434,849 A | | 7/1995 | Vicard et al. | 370/32.1 |
| 5,450,425 A | | 9/1995 | Gunn et al. | 371/67.1 |

OTHER PUBLICATIONS

"AT&T Microelectronics, T7540 Digital Telephone CODEC Data Sheet and Addendum", 1–4, published in Jul. 1991,.

"AT&T Microelectronics, WE DSP16C Digital Signal Processor/C0DEC Preliminary Data Sheet", 1–63, (May 1991).

"Dynamic Setting of Modem Parameters", *IBM Technical Disclosure Bulletin, vo. 26, No. 1, Jun. 1983, pp. 261–262,.*

"Resume Operation for Interanl Modems", *IBM Technical Disclosure Bulletin, vol. 5, No. 48, Sep. 1992, pp. 398–399,.*

"Technique for Power Management in Signal Processors", *IBM Technical Disclosure Bulletin, vol. 35, No. 5, Oct., 1992, pp. 425–427,.*

"Zilog Intelligent Perpheral Controllers, Z84C01 Z80 CPU with Clock Generator/Controller", pp. 43–73, (1991).

"Zilog Intelligent Peripheral Controllers, Z84C90 CMOS Z80 KIO Serial/Parallel/Counter/Timer", pp. 205–224, (1991).

Ashton, A.R., et al., "Molecular Cloning of Two Different cDNAs for Maize Acetyl CoA Carboxylase", *Plant Molecular Biology, 24,* 35–49, (1994).

Tolly, K., "The New Branch Office Routers", *Data Communications, p. 58–70, Aug. 1994,.*

* cited by examiner

US 6,928,108 B2

MODEM WITH FIRMWARE UPGRADE FEATURE

This application is a continuation of Ser. No. 08/368,291, filed Jan. 3, 1995 now U.S. Pat. No. 6,341,143, entitled "Modem With Firmware Upgrade Feature" which is a continuation-in-part of U.S. Pat. application Ser. No. 08/087,164, entitled "Modem with Firmware Upgrade Feature", filed Jul. 2, 1993, now U.S. Pat. No. 6,031,867.

FIELD OF THE INVENTION

The present invention relates to communications systems and in particular to a modem in which the firmware which controls the operation of the modem can be changed or upgraded remotely.

BACKGROUND

Presently, there are several mechanisms through which software upgrades, bug fixes and the like are distributed to users. In systems employing firmware storage of operating programs, such as Electrically Programmable Read Only Memory (EPROM) and the like, bug fixes or enhancements to system firmware require programming a new EPROM with the updated code and shipping the new EPROM to the customer. A technician then travels to the site, disassembles the hardware, and replaces the old EPROM with the new one.

Unfortunately, these methods are very inconvenient. First, a considerable time delay is encountered while waiting for the manufacturer to program and ship the replacement parts. Second, the hardware may not be operable if the user is waiting for a bug fix. Especially true in cases of bug fixes where the hardware might not be operable without the updated operating code. Also, the replacement of the old with the new EPROM requires a technician to travel to the site and use special tools to disassemble the hardware and replace the outdated on faulty part or parts. This results in an increased expense for repairs or upgrades because technician time and special tools are required. Current update methods are thus time consuming, expensive and inefficient.

There is a need in the art, therefore, for a modem which allows remote changes and/or upgrades to be made to the firmware stored operating code, without requiring disassembly and replacement of parts, technician time, or special tools, thus resulting in the more efficient and cost effective means of updating firmware.

SUMMARY

To overcome the shortcomings in the art described above, and to provide other advantages which will become apparent upon reading and understanding the present specification, the present system is a modem system which includes hardware and software components. The system allows the user to connect to remote locations equipped with a similar system or with modems or facsimile machines over a single analog telephone line. The incorporation of various power saving features allow practical implementation of a small, lightweight and easily transportable modem system powered from a standard 9 volt battery. The present modem system also incorporates storage of operating code and parameters in an in-circuit reprogrammable memory chip. Multiple embodiments of the present invention are discussed which allow for remote programming of the modem system. In one embodiment, a user can thus remotely upgrade system firmware with updates, bug fixes, enhancements or other new releases of system operating code by downloading the update over a phone line to a host PC and reprogramming the memory chip of the modem over the serial port from the host PC. In another embodiment, the user can remotely upgrade the modem system firmware by directly programming the memory chip of the modem without the assistance of the host PC.

BRIEF DESCRIPTION OF THE DRAWINGS

In the drawings, where like numerals refer to like components throughout the several views.

DETAILED DESCRIPTION OF THE PREFERRED EMBODIMENTS

In the following detailed description of the preferred embodiment, reference is made to the accompanying drawings which form a part hereof, and in which is shown by way of illustration specific embodiments in which the inventions may be practiced. These embodiments are described in sufficient detail to enable those skilled in the art to practice the invention, and it is to be understood that other embodiments may be utilized and that structural changes may be made without departing from the spirit and scope of the present inventions. The following detailed description is, therefore, not to be taken in a limiting sense, and the scope of the present inventions is defined by the appended claims.

Figure 1:
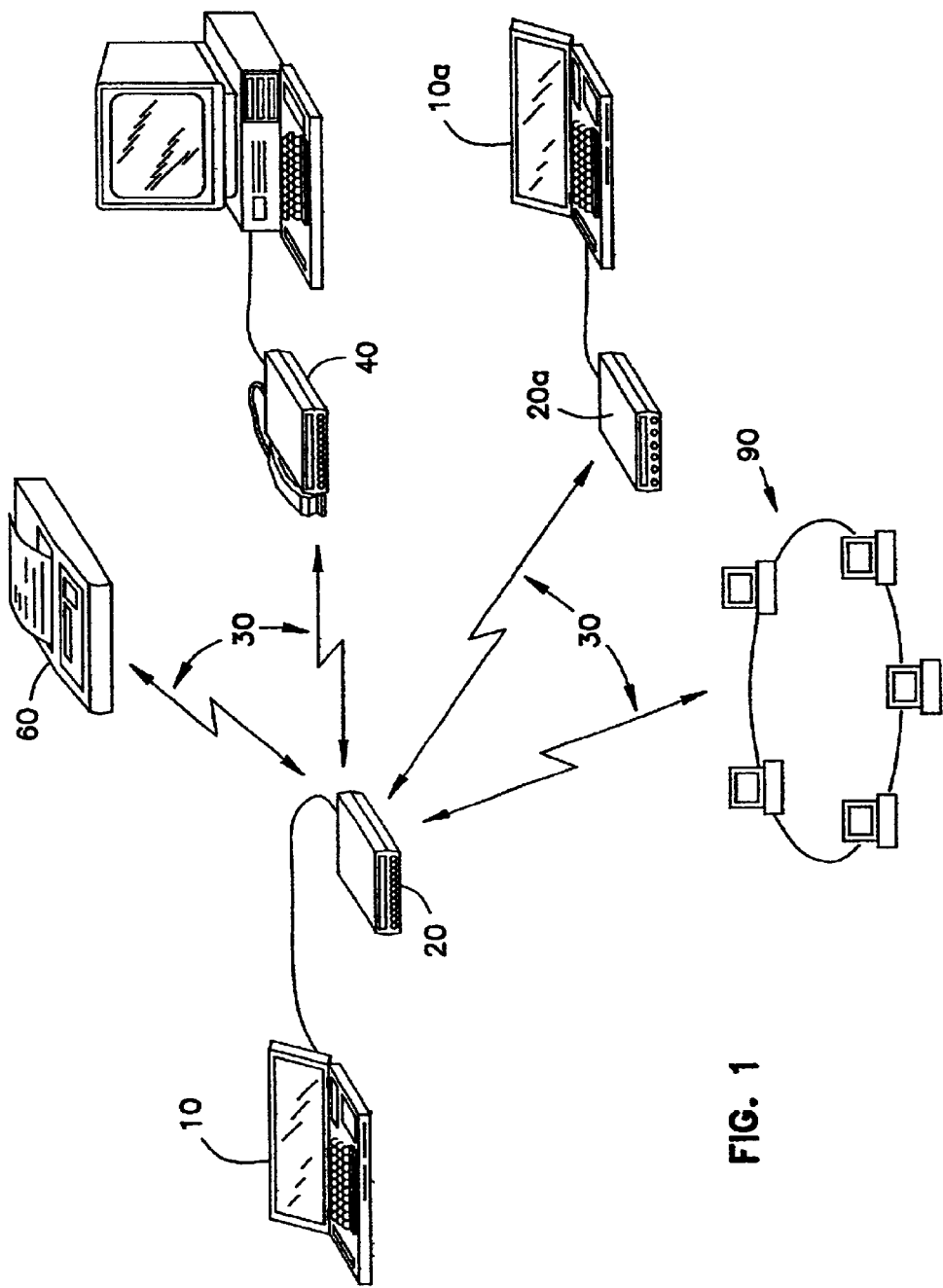
FIG. 1 shows the telecommunications environment within which the present system may operate.

FIG. 1 shows a typical arrangement for the use of the present modem system. Hardware components 20 contain the present modem system and are connected to laptop computer 10. Hardware components 20 communicate over a standard telephone line 30 to one of a variety of remote sites. For example, one of the remote sites may be equipped with the present modem system including hardware components 20a and laptop computer 10a. The present modem system can also connect over phone lines 30 to fax machine 60, to a personal computer and associated modem 40, or to a network of personal computers 90. Those skilled in the art will readily recognize the wide variety of communication interconnections possible with the present system by reading and understanding the following detailed description.

Hardware Components

Figure 2:
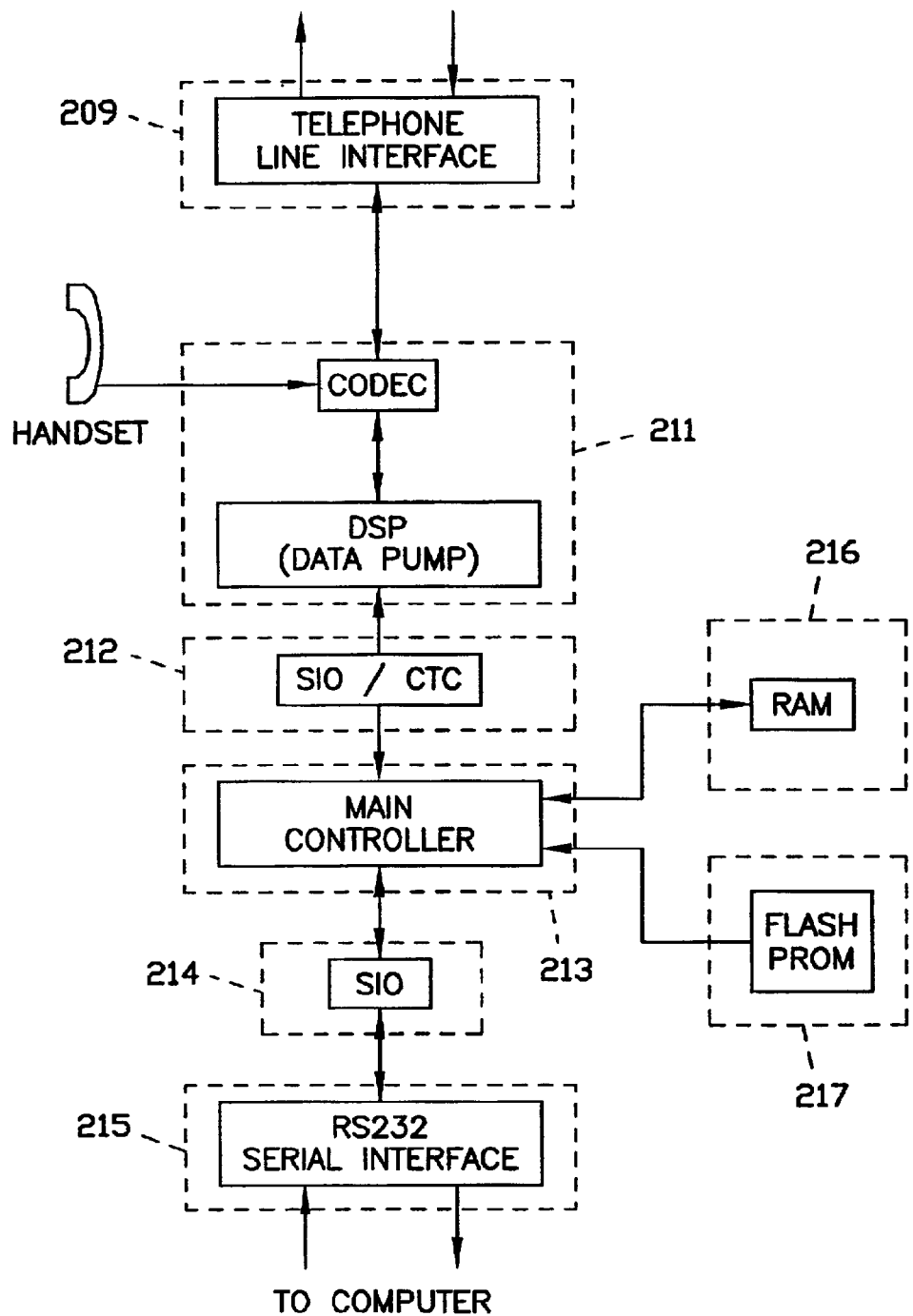
FIG. 2 is a block diagram of the hardware components of the present system.

FIG. 2 is a block diagram of the hardware components of the present system corresponding to reference number 20 of FIG. 1. These components form the link between the user, the laptop or personal computer (PC) and the telephone line interface.

The preferred embodiment of the present system preferably includes a data pump circuit 211, which includes a digital telephone coder-decoder (CODEC) and a digital signal processor (DSP) for communicating over the telephone line interface 209. The data pump DSP of circuit 211 performs functions such as modulation, demodulation and echo cancellation to communicate over the telephone line interface 209 using a plurality of telecommunications standards including FAX and modem protocols. The main controller circuit 213 directly controls the DSP data pump circuit 211.

As described more fully below, the main controller circuit 213 includes, in the preferred embodiment, a microprocessor which controls the functions and operation of all of the hardware components shown in FIG. 2. The main controller is connected to RAM circuit 216 and a programmable and electrically erasable read only memory or Flash PROM circuit 217. The Flash PROM circuit 217 includes non-volatile memory in which the executable control programs for the main controller circuits 213 are stored.

The RS232 serial interface 215 communicates to the serial port of the personal computer which is running the software components in the first embodiment of the present system. The RS232 serial interface circuit 215 is connected to a serial input/output circuit 214 with main controller circuit 213.

In one embodiment of the present invention, data is received from the telephone line over telephone line interface circuit 209 and forwarded by the data pump circuit 211 and the main controller circuit 213 over the serial line interface circuit 215 to the personal computer. If the data is upgrade program data, then it is processed and transmitted back to serial line interface circuit 215 to be loaded into RAM circuit 216, and ultimately, into Flash PROM circuit 217.

In a second embodiment of the present invention, upgrade program data is received from the telephone line over telephone line interface circuit 209 and stored in RAM 216 via data pump circuit 211 and main controller circuit 213. The upgrade program data stored in RAM circuit 216 is later programmed into Flash PROM circuit 217.

Detailed Electrical Schematic Diagrams

Figure 3:
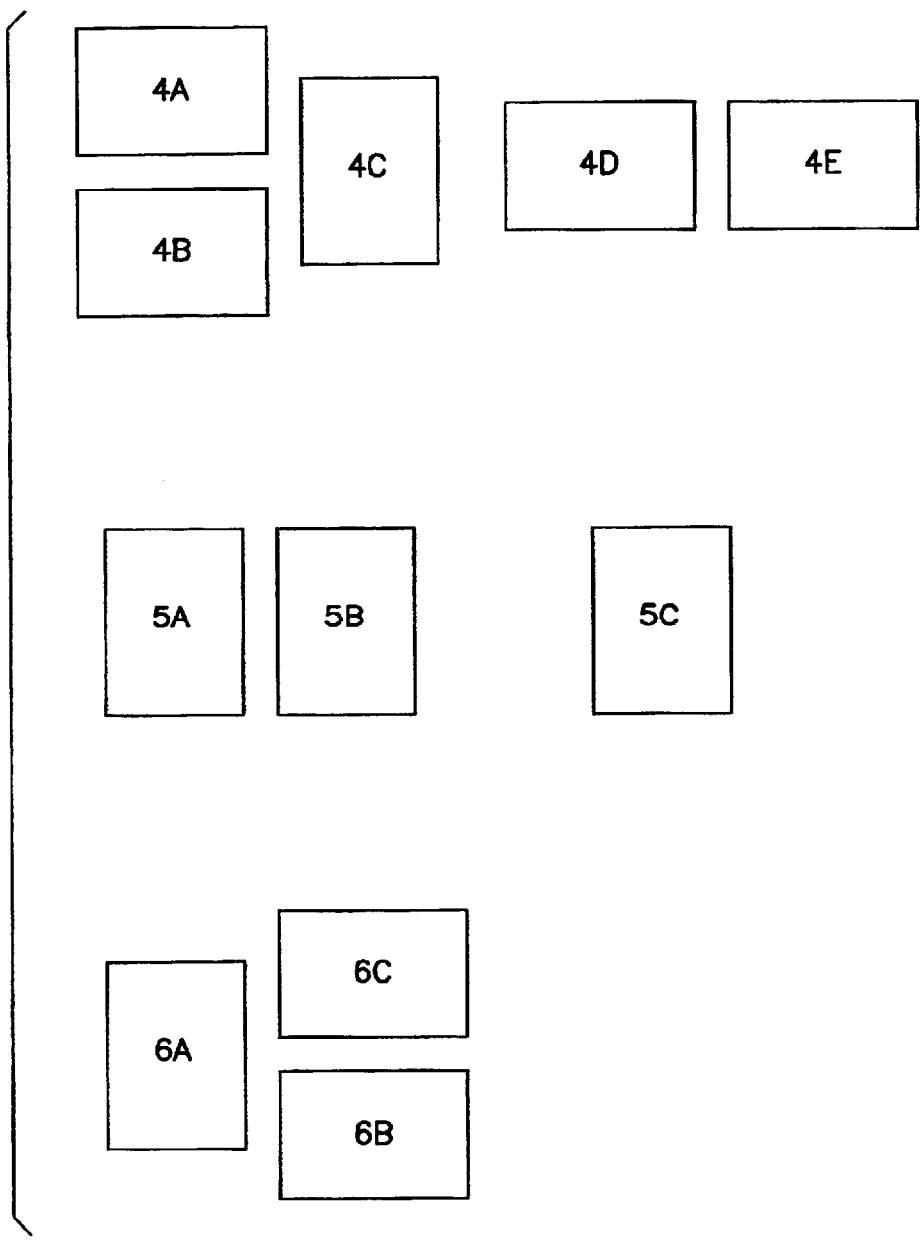
FIG. 3 is a key for viewing the detailed electrical schematic diagrams of FIGS. 4A–6C to facilitate understanding of the interconnections between the drawings.

The detailed electrical schematic diagrams comprise FIGS. 4A–E, 5A–C, 6A–C and 7A–C. FIG. 3 shows a key for how the schematic diagrams may be conveniently arranged to view the passing of signals on the electrical lines between the diagrams. The electrical connections between the electrical schematic diagrams are through the designators listed next to each wire. For example, on the right side of FIG. 4A, address lines A0–A19 are attached to an address bus for which the individual electrical lines may appear on other pages as A0–A19 or may collectively be connected to other schematic diagrams through the designator "A" in the circle connected to the collective bus. In a like fashion, other electrical lines designated with symbols such as RNGL on the lower left-hand side of FIG. 4A may connect to other schematic diagrams using the same signal designator RNGL.

Figure 4A:
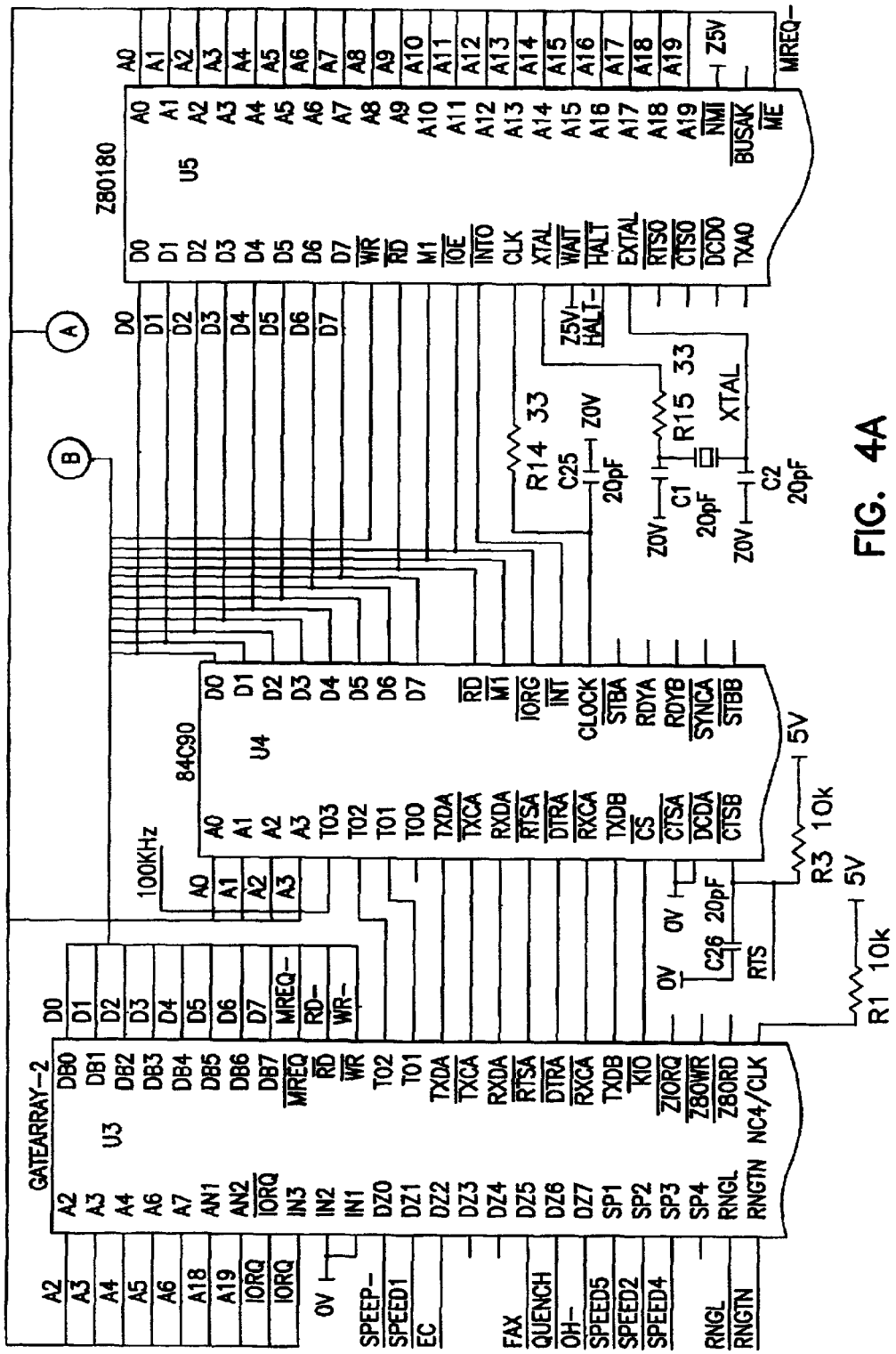
FIGS. 4A–4E, 5A–5C and 6A–6C are detailed electrical schematic diagrams of the circuitry of the hardware components of the present system.
Figure 4B:
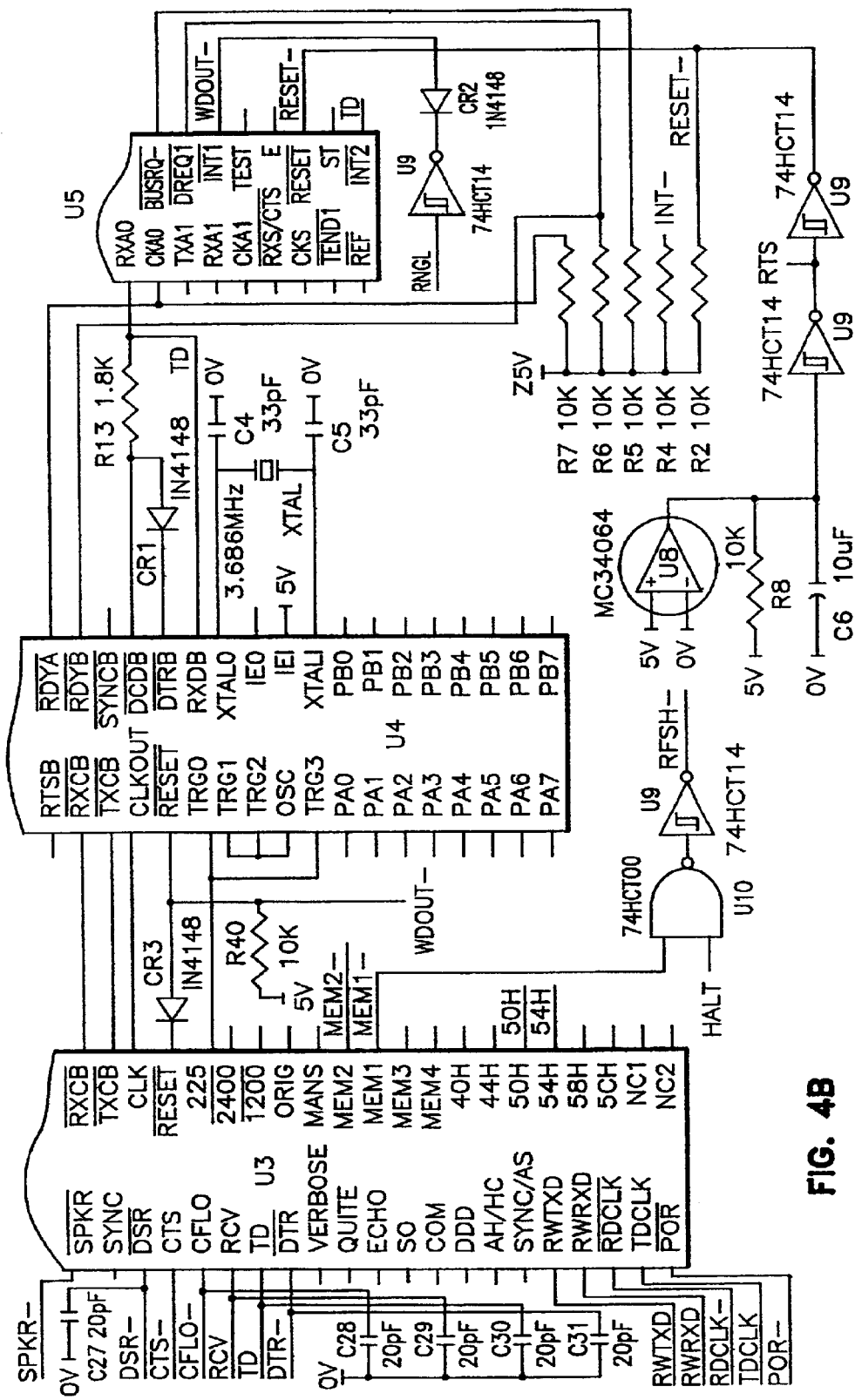
Figure 4C:
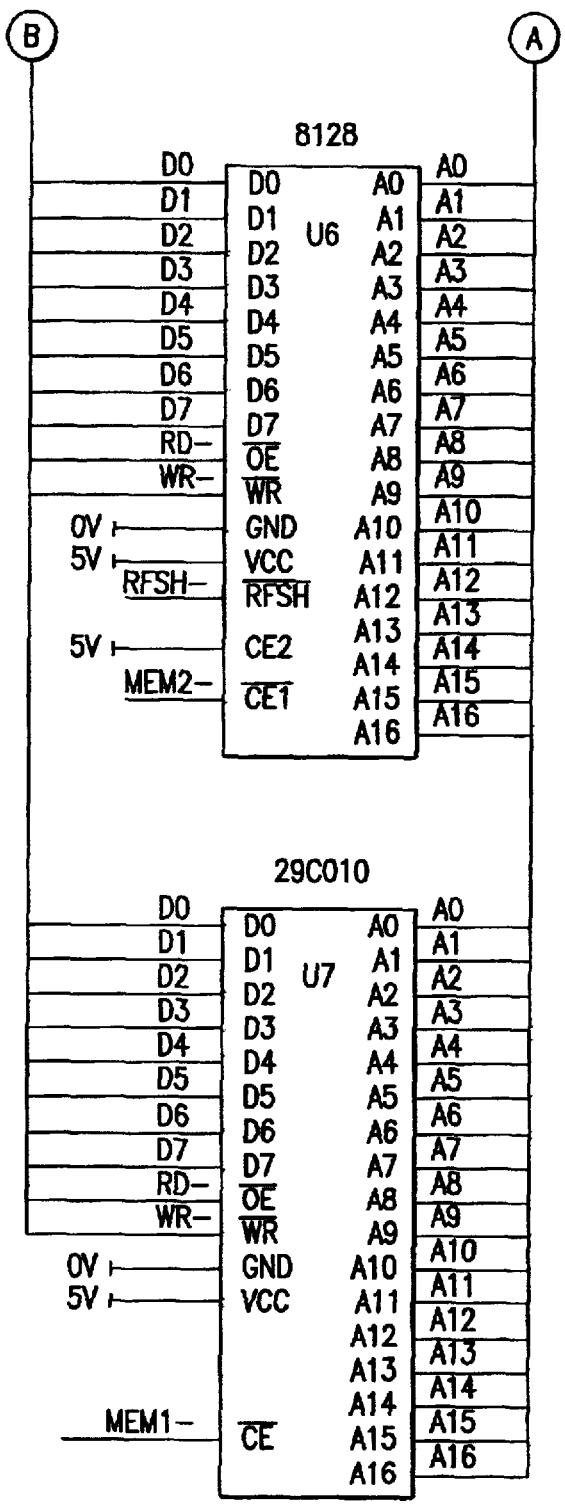
Figure 4D:
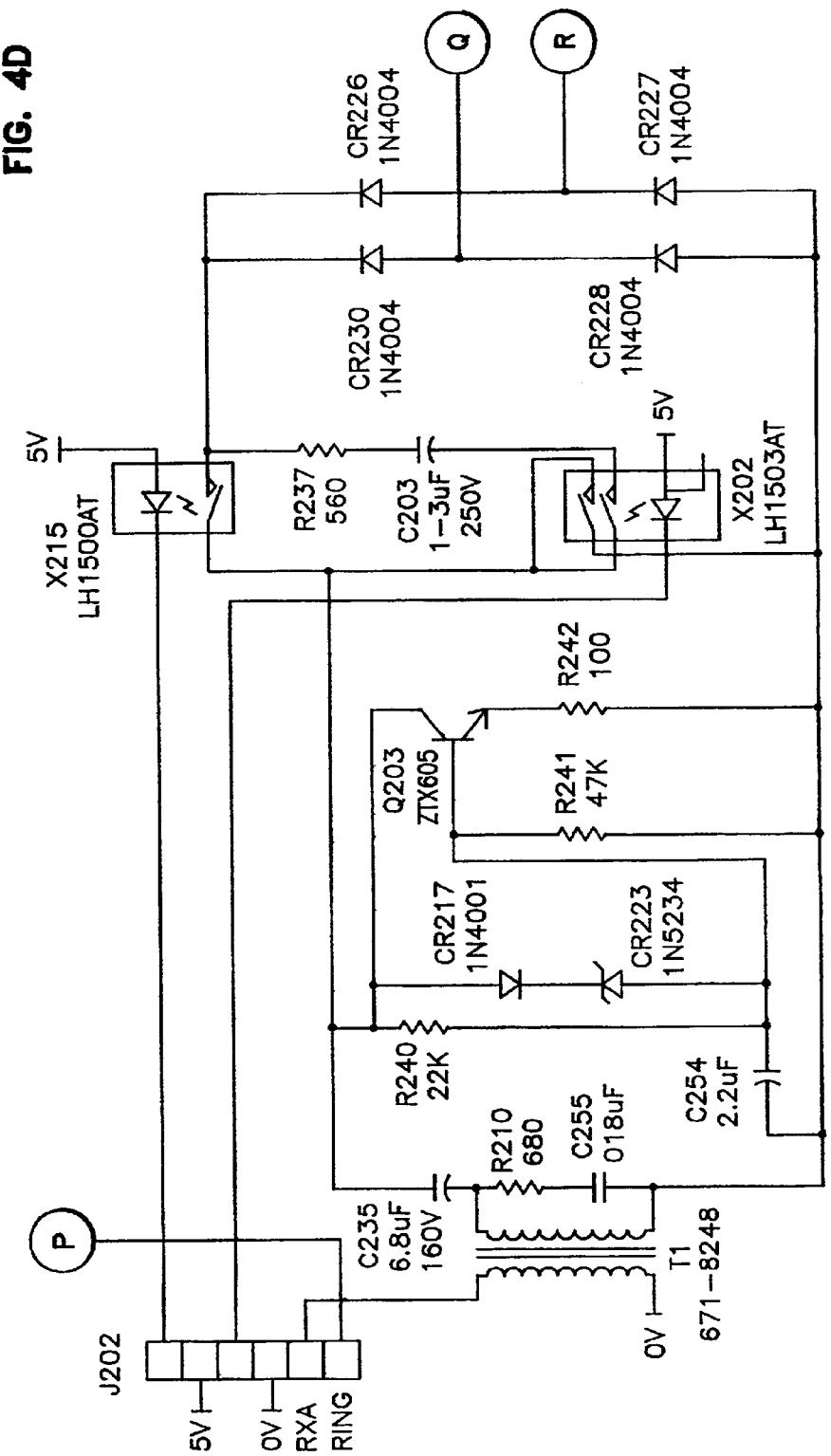
Figure 4E:
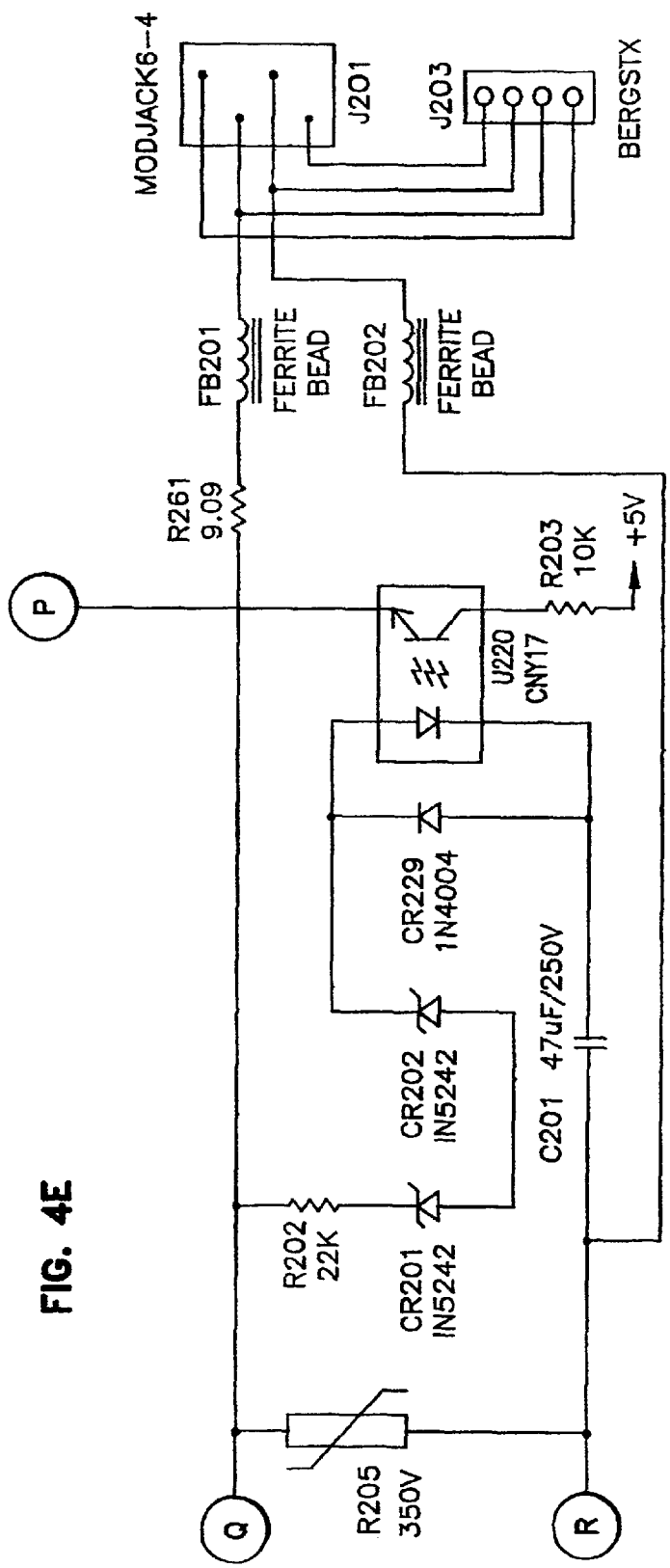

Beginning with the electrical schematic diagram of FIGS. 4D and 4E, the DAA circuitry (telephone line interface) is shown. The telephone line connection in the preferred embodiment is through connector J201 which is a standard six-pin modular RJ-11 jack. In the schematic diagram of FIG. 4E, only the tip and ring connections of the first telephone circuit of the RJ-11 modular connector are used. Ferrite beads FB201 and FB202 are placed on the tip and ring wires of the telephone line connections to reduce high frequency or RF noise that may radiate from telephone line. The incoming telephone line is also overvoltage protected through SIDACTOR R205. The incoming telephone line is full wave rectified by the full wave bridge comprised of diodes CR230, CR226, CR227 and CR228 of FIG. 4D.

Also connected across the incoming telephone line is a ring detect circuit. Optical isolator U220 (part model number CNY17) senses the ring voltage threshold when it exceeds the breakdown voltages on zener diodes CR201 and CR202.

The DAA circuitry is physically isolated from the rest of the system by transformer T1, optocoupler U220 and two solid state relays X215 and X202 which are optically coupled. Connector J203 is a four pin header used for automatic testing during manufacturing and for diagnostics.

Relay X215 shown in FIG. 4D is used to accomplish pulse dialing by opening and shorting the tip and ring wires. Transistor Q203 along with the associated discrete resistors comprise a holding circuit to provide a current path or current loop on the telephone line to grab the line. The DAA circuitry shown in FIGS. 4D and 4E can be customized to interface to the varying telephone standards used in the United States and in many different European countries.

Connector J202 shown in FIG. 4D connects the telephone line interface circuitry described above to connector J102 shown in FIG. 6A and thusly to the rest of the circuit. Incoming RXA signals are buffered by the two operational amplifiers U104 as shown in FIG. 6B. The first stage of buffering is used to drive the transmit carrier signal to the telephone line. The second stage of the input buffering is configured for a moderate amount of gain before driving the signal into CODEC U101. This stage is also used to reduce the amount of transmit signal that is fed back into the receiver. The signal from amplifiers U104 is also fed to speaker driver U105, which drives speaker X101.

Data and address buses A and B shown in FIGS. 4A and 4B connect the Z80180 microprocessor in microcontroller U5 with the Z80 KIO circuit U4 and a gate array circuit U3, and to other portions of the electrical schematic diagrams. Gate array U3, also shown in FIGS. 4A and 4B, includes the "glue logic" used to support various functions in the hardware components of the present invention. Gate array U3 includes miscellaneous latch and buffer circuits for the present system which normally would be found in discrete SSI or MSI integrated circuits. By combining a wide variety of miscellaneous support circuits into a single gate array, a much reduced design complexity and manufacturing cost is achieved.

Figure 5A:
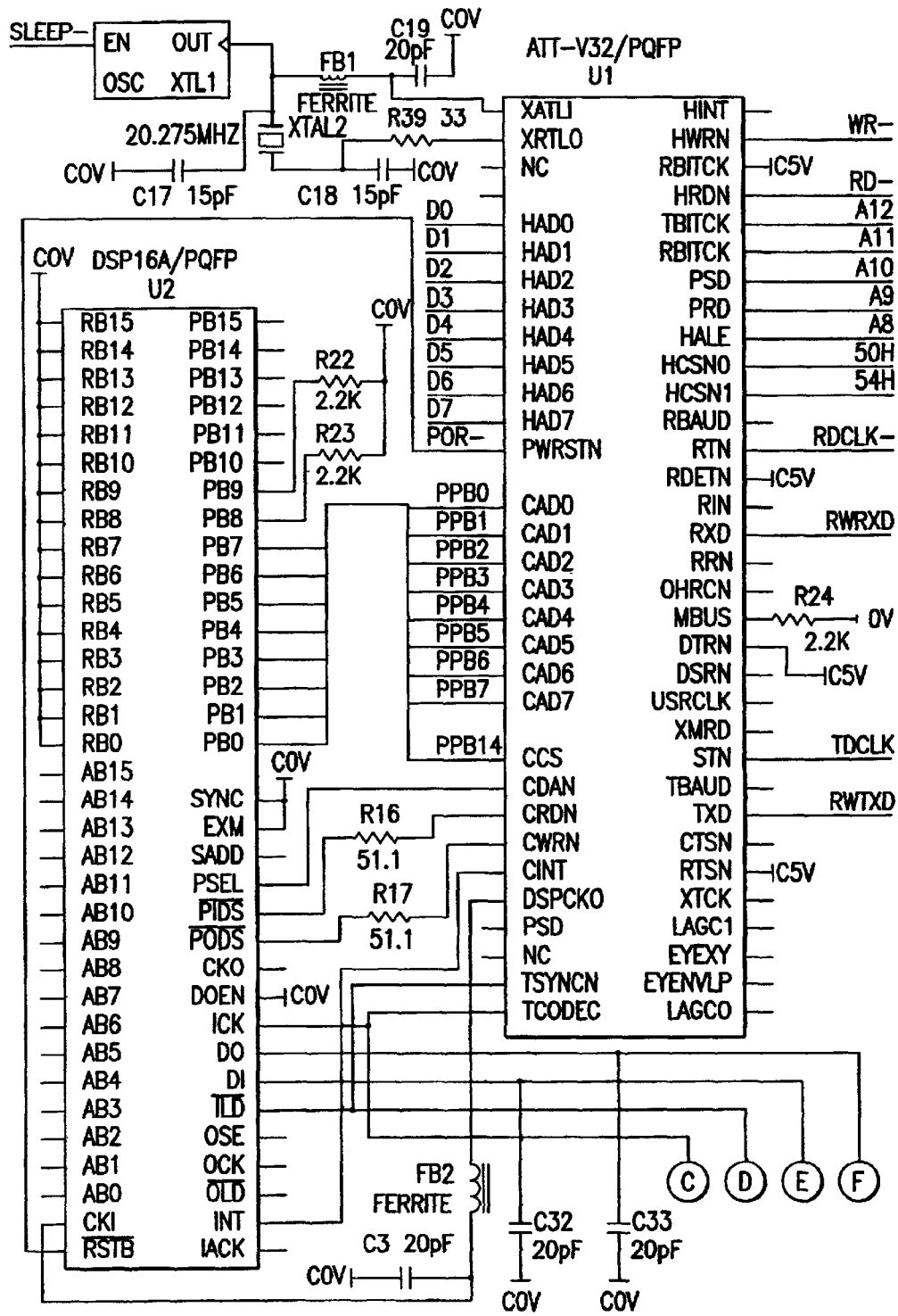

CODEC chip U101 shown in FIG. 6B, interface chip U1 shown in FIG. 5A and digital signal processor (DSP) chip U2 shown in FIG. 5A comprise a data pump chip set manufactured and sold by AT&T Microelectronics. A detailed description of the operation of these three chips in direct connection and cooperation with one another is described in the publication entitled "AT&T V.32bis/V.32/ FAX High-Speed Data Pump Chip Set Data Book" published by AT&T Microelectronics, December 1991, which is incorporated herein by reference. This AT&T data pump chip set comprises the core of an integrated, two-wire full duplex modem which is capable of operation over standard telephone lines or leased lines. The data pump chip set conforms to the telecommunications specifications in CCITT recommendations V.32bis, V.32, V.22bis, V.22, V.23, V.21 and is compatible with the Bell 212A and 103 modems. Speeds of 14,400, 9600, 4800, 2400, 1200, 12,000 and 300 bits per second are supported. This data pump chip set consists of a ROM-coded DSP16A digital signal processor U2, and interface chip U1 and an AT&T T7525 linear CODEC U101. The AT&T data pump chip set is available from AT&T Microelectronics.

The chip set U1, U101 and U2 on FIGS. 5A and 6B perform all A/D, D/A, modulation, demodulation and echo cancellation of all signals placed on or taken from the telephone line, and performs DTMF tone generation and detection, signal analysis of call progress tones, etc. The transmission of information on the telephone line from CODEC U101 is through buffers U104, and through line buffer U105 as described above.

The main controller of controller circuit 213 and the support circuits 212, 214, 215, 216 and 217 are shown in FIGS. 4A–4C and 5A. In the preferred embodiment of the present system, the main controller U5 shown in FIGS. 4A and 4B is a Z80180 eight-bit microcontroller chip. In the preferred implementation, microcontroller chip U5 is a Z80180 microprocessor, by Zilog, Inc. of Campbell, Calif. The Zilog Z80180 eight-bit microprocessor operates at a 12.288 MHz internal clock speed by means of an external crystal XTAL, which in the preferred embodiment, is a 24.576 MHz crystal. The crystal circuit includes capacitors C1 and C2 which are 20 pf capacitors and resistor R15 which is a 33 ohm resistor. The crystal and support circuitry is connected according to manufacturer's specifications found in the Zilog Intelligent Peripheral Controllers Data Book published by Zilog, Inc. The product description for the Z80180 Z180 MPU from the Z80 CPU Product Specification pages 351–392 of the Zilog 1991 Intelligent Peripheral Controllers databook is incorporated herein by reference.

The Z80180 microprocessor in microcontroller chip U5 is intimately connected to a serial/parallel I/O counter timer chip U4 which is, in the preferred embodiment, a Zilog 84C90 CMOS Z80 KIO serial/parallel/counter/timer integrated circuit available from Zilog, Inc. This multi-function I/O chip U4 combines the functions of a parallel input/output port, a serial input/output port, bus control circuitry, and a clock timer circuit in one chip. The Zilog Z84C90 product specification describes the detailed internal operations of this circuit in the Zilog Intelligent Peripheral Controllers 1991 Handbook available from Zilog, Inc. Z84C90 CMOS Z80KIO Product specification pgs. 205–224 of the Zilog 1991 Intelligent Peripheral Controllers databook is incorporated herein by reference.

The memory chips which operate in conjunction with the Z180 microprocessor in microcontroller chip U5 are shown in FIG. 4C. The connections A, B correspond to the connections to the address and data buses, respectively, found on FIG. 4A. Memory chip U7 is a read-only memory (ROM) chip which is electrically reprogrammable in circuit. This programmable ROM, typically referred to as a flash PROM, holds the operating code and operating parameters for the present system in a non-volatile memory. Upon power-up, microcontroller chip U5 executes the program code that is stored in the flash PROM U7. In the preferred embodiment, RAM chip U6 is a pseudostatic RAM which is a dynamic RAM with a built-in refresh. Those skilled in the art will readily recognize that a wide variety of memory chips may be used and substituted for pseudo-static RAM U6 and flash PROM U7 without departing from the scope of the present invention.

The interface between the main controller circuit 213 and the personal computer is through SIO circuit 214 and RS232 serial interface 215. RS232 connection J103 is shown on FIG. 6A with the associated RS232 driver circuit U102 and interface and ring detect circuitry used to generate and receive the appropriate RS232 standard signals for a serial communications interface with a personal computer.

Figure 6A:
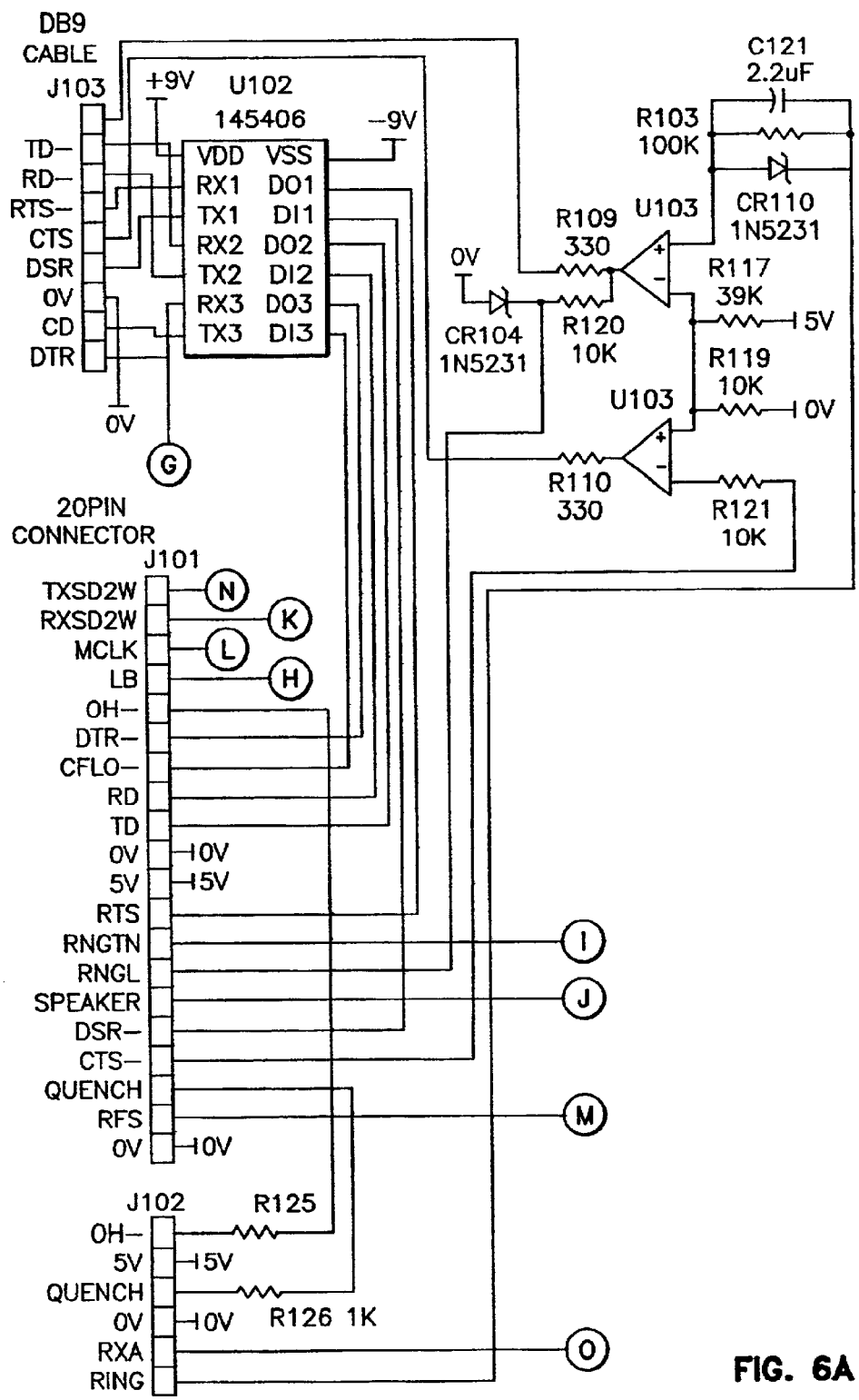
Figure 6B:
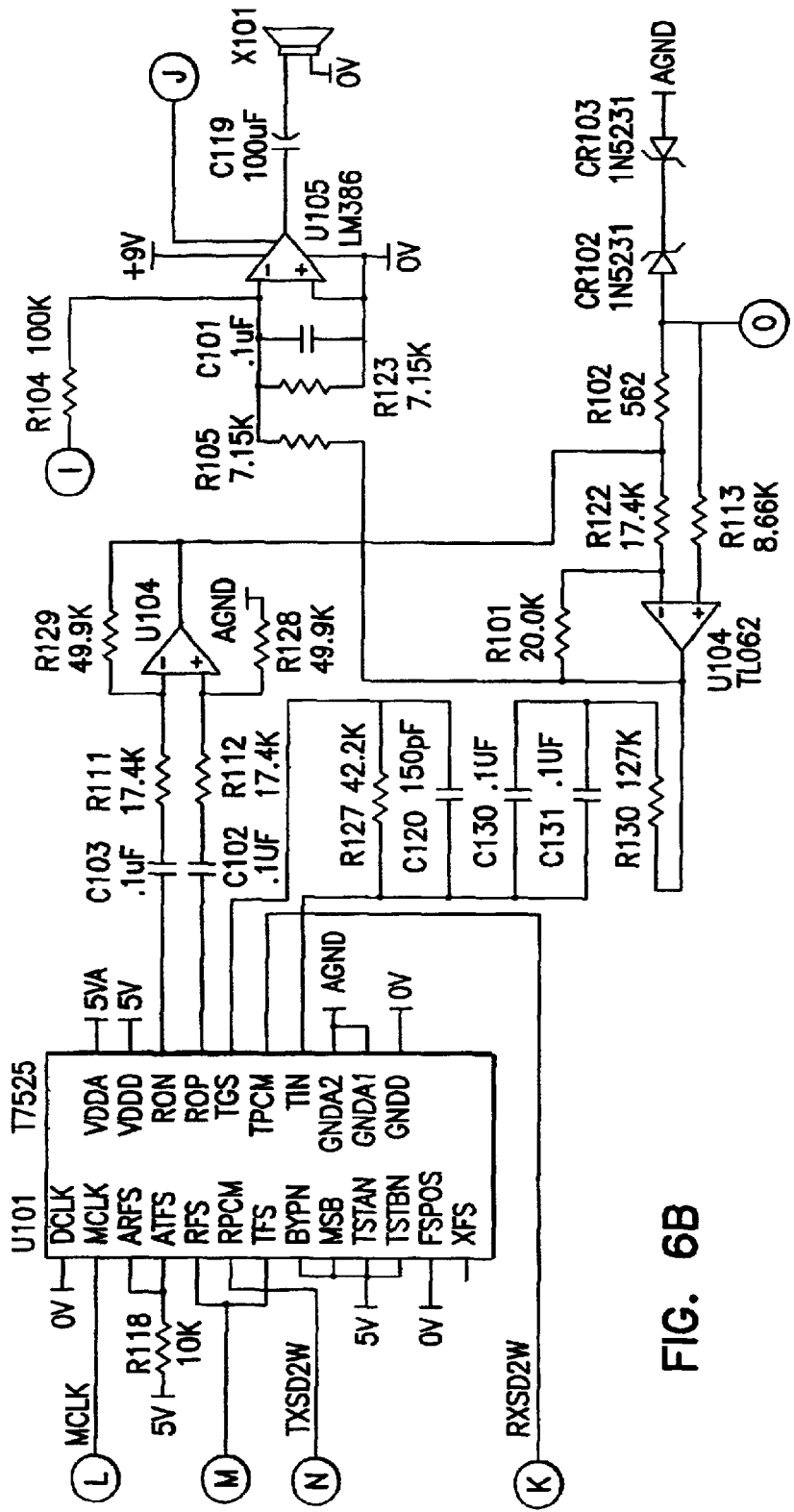
Figure 6C:
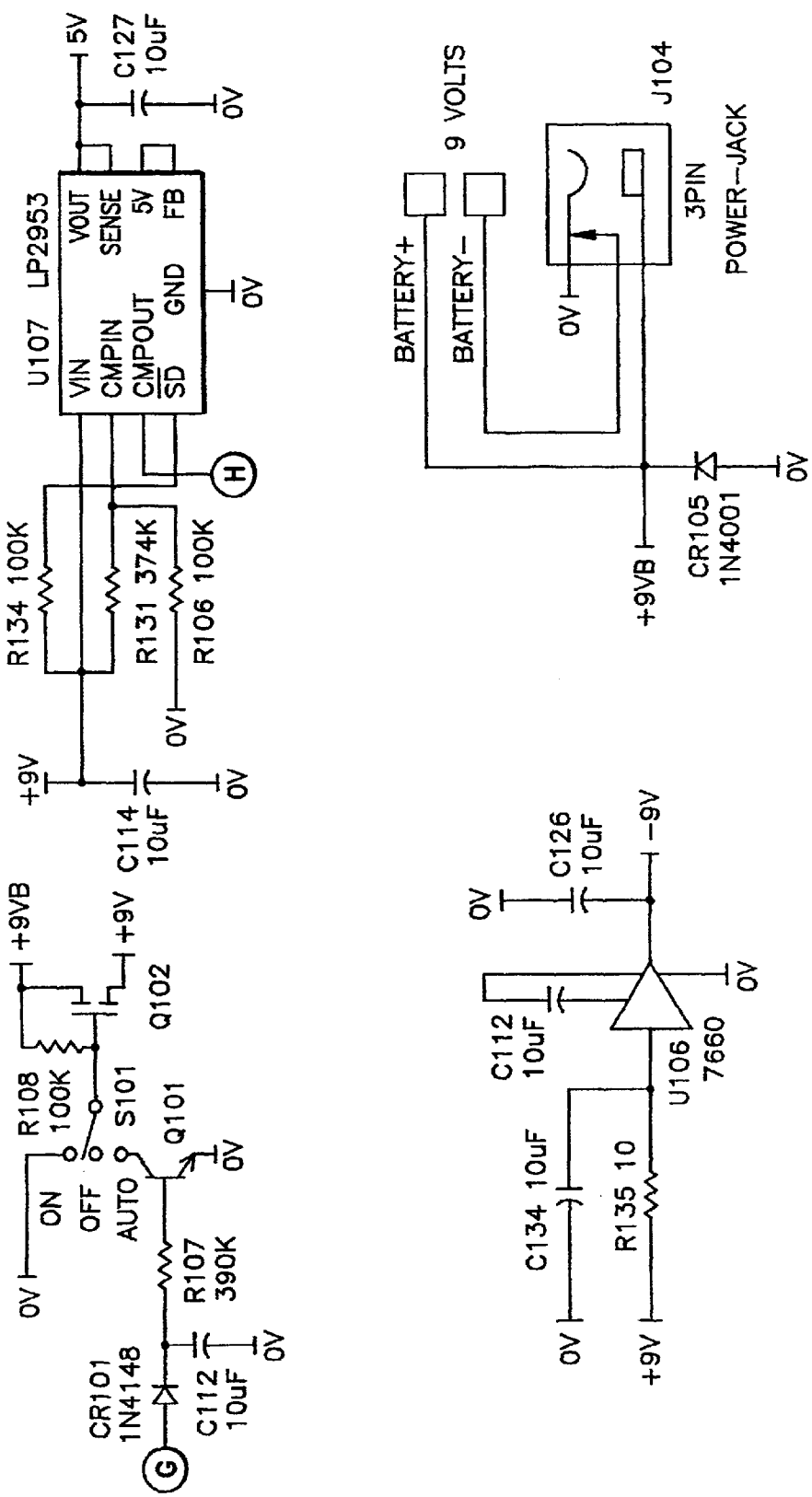

FIG. 6C is a detailed electrical schematic diagram showing the generation of various voltages for powering the hardware components of the electrical schematic diagrams described herein. The power for the present hardware components described herein is received from either a standard 9 volt battery or through AC adaptor J104 which is a standard 3 Pin Power Jack. When the AC adaptor is plugged in, the battery is disconnected. Power is controlled by power switch S101. The preferred modem system is designed to run off of a standard 9 Volt battery, thus resulting in a small, lightweight and easily transportable package. However, it shall be understood that the modem could also be run from any other power source using standard interfaces and conversion circuitry known well in the art. 5 volt regulator U107 is a linear regulator with a low drop out voltage of about 5.3. Q102 is a MOSFET which controls on/off as directed by power switch S101. Power switch S101 turns on MOSFET Q102, and has three positions, on, off, or auto. In auto position, power switch S101 senses the Data Terminal Ready Signal from the computer, and if that is not present, then the power to the modem is turned off completely. Thus, if no communications software is loaded, the modem is automatically off such that no power is wasted. From the circuitry of FIG. 6C, the +9 volts DC is regulated down to 5 volts, and is also inverted via U106 to get a negative voltage. The negative voltage is used to drive the RS232 driver U102 shown in FIG. 6A. As a result, five volts are derived for operating the various memory, logic and controller chips and support circuitry of the present system.

Figure 5B:
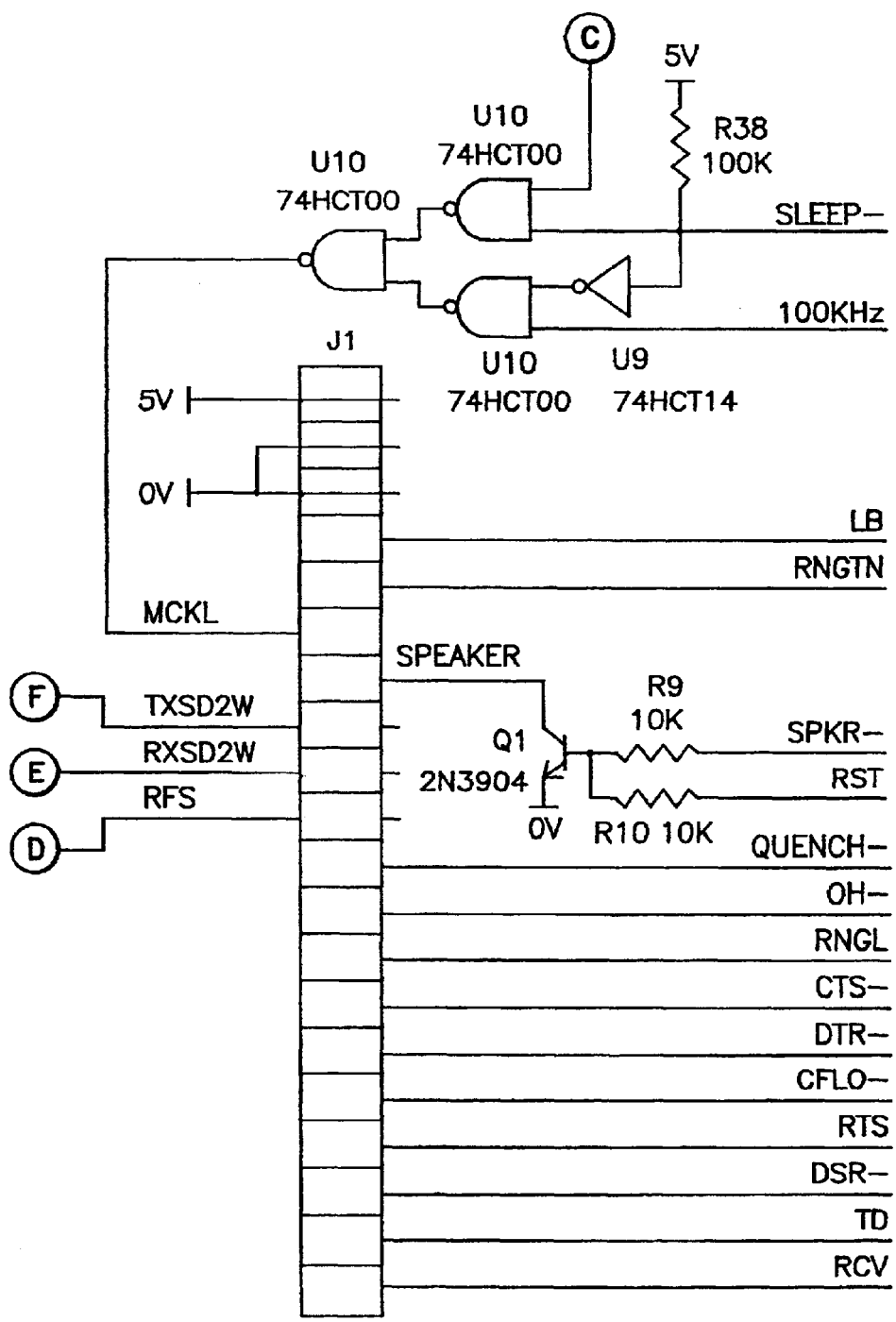
Figure 5C:
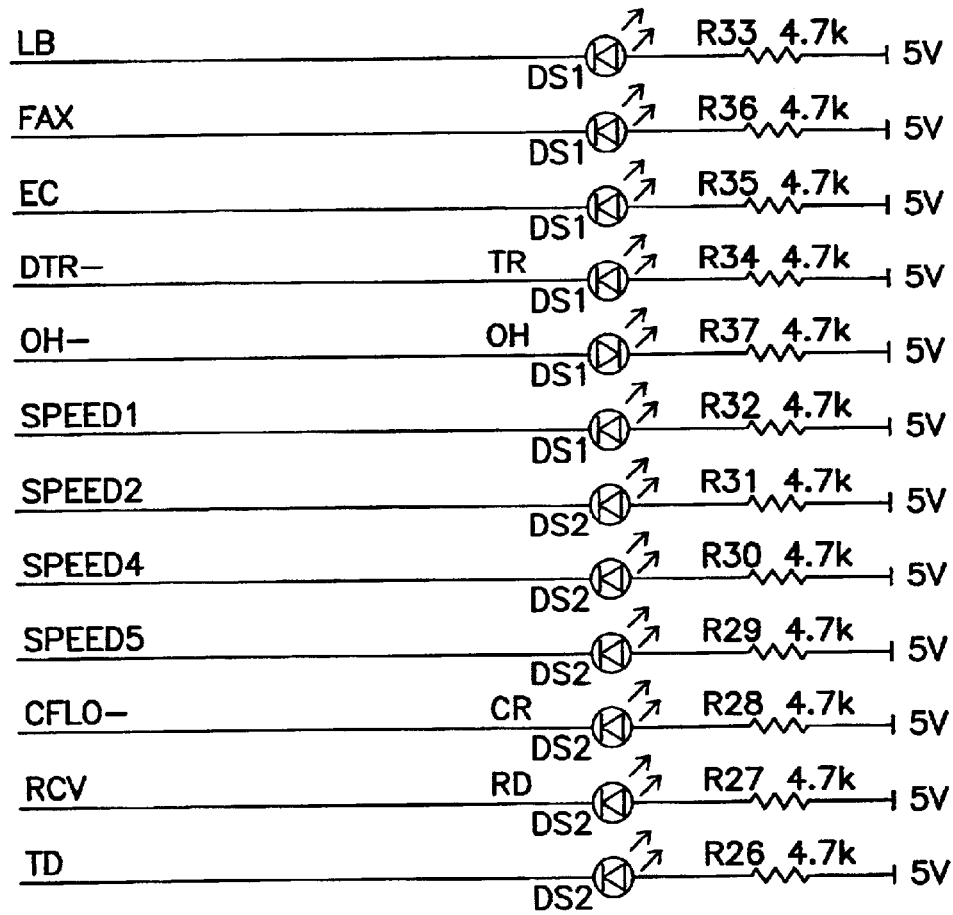

FIG. 5B shows connector J1 which interfaces with connector J101 shown in FIG. 6A. FIG. 5C shows the interconnection of the status LED's found on the front display of the modem of the present invention.

Power Saving Features

Referring again to FIG. 5A, the interface chip U1, discussed in detail above is shown. Also shown in the upper left portion of FIG. 5A is power saving circuitry which is incorporated into the present modem system to enable the practical implementation of a small, lightweight and easily portable modem suitable for use with a laptop computer, for example. The power saving features of the present modem system allow the design to be powered from a standard 9 volt battery as discussed above with respect to FIG. 6C.

In order to conserve power, various power saving features are provided which allow the present modem system to be put in a low power, or "sleep" mode. In sleep mode the power to the modem is greatly reduced. There are three main power saving features in the sleep mode. First, additional circuitry has been added in the preferred embodiment to allow additional power savings to be realized. Second, the AT&T data pump chip set has a built in low power mode. Third, the Z180 MPU U5 also has a built in low power mode.

The AT&T data pump chip set U1, U2 and U101 described in detail above has the ability to be put into a low power mode. When in low power mode, the CODEC bit clock TCODEC generated by interface chip U1 shown on FIG. 5A is slowed to 115 kHz to provide a required clock signal to DSP chip U2 and CODEC U101. The data pump chip set enters sleep mode automatically after a reset, a disconnect or by user command. The chip set automatically wakes up when a ring signal or host command is received. The built-in sleep mode of the AT&T data pump chip set is described in more detail in the aforementioned publication entitled "AT&T V.32 bits/V.32/FAX High-Speed Data Pump Chip Set Data Book" published by AT&T Microelectronics, December 1991.

In addition to the power saving sleep mode provided by the AT&T data pump chip set U1, U2 and U101, the present invention provides additional power saving features. These features include providing an external clock oscillator XTL1. Circuitry is provided such that external clock oscillator XTL1 can also be put in sleep mode (disabled). This results in a significant power savings as the oscillator would consume power unnecessarily when the modem is not in use. When XTL1 is disabled, the clock to CODEC U101 is switched to a low frequency, approximately 100 KHz signal generated from K10 U4 of FIG. 4A via NAND gate U10 of FIG. 5B.

Crystal XTL2 is a 20.275 MHZ crystal which is used in conjunction with an internal oscillator provided on interface chip U1. The internal oscillator is described in the above listed documentation for interface chip U1.

The present modem system can be assembled with either the crystal XTL2/C17/C18 combination or the external clock oscillator XTL1/C19 combination. With either combination, the power saving feature built into the AT&T data pump chip set U1, U2 and U101 can be used. However, with the XTL1/C19 combination the AT&T data pump chip set power saving feature and also the additional feature of disabling external oscillator XTAL1 can be used for even greater power savings. External clock oscillator XTL1 is part number CO2810 available from Raltron Corporation of Miami, Fla. External clock oscillator XTL1 has a frequency of 40.5504 MHz and is described in more detail in the publication entitled "CLOCK OSC, Model CO2810 Series (SMD Type OSC)", published by Raltron Corporation, which is incorporated herein by reference. In the preferred embodiment, external clock oscillator XTL1 is used as the main clock for the AT&T data pump chip set U1, U2 and U101 and runs at 40.5504 MHZ to drive the interface chip U1.

When the present modem system is off-hook and the Z180 MPU U5 is not processing, the Z180 MPU U5 can be put into a low power or SLEEP mode. The Z180 MPU SLEEP mode places the CPU into a state in which the internal CPU clock stops, thereby consuming less current. The Z180 MPU U5 wakes up when one of the interrupts INT0, INT1 or INT2 shown in FIGS. 4A and 4B is asserted.

INT0 wakes up the Z180 MPU U5 in response to interrupts generated by K10 U4. INT1 wakes up the Z180 MPU U5 in response to a RNGL or watchdog timer (WDOUT-) signal. The watchdog is a slow timer (in the seconds) which allows the processor to keep track of time. For example, the processor must keep track of the time for which the modem cannot call a blacklist of forbidden phone numbers. INT2 wakes up the Z180 MPU U5 in response to a DTE data signal (TD shown in FIG. 5B).

The built in SLEEP mode of the Zilog Z180 MPU U5 is described in more detail in the aforementioned publication Zilog Intelligent Peripheral Controllers 1991 Handbook.

Functional Description of Upgrade Control Program For A First Embodiment of the Modem System A first embodiment of the modem system includes two control programs which control the remote in-circuit reprogramming of system firmware, a flash control program and a boot control program. In this embodiment, the flash control program runs in the host PC and receives updated operating code downloaded from a bulletin board. The updated code is downloaded to the host PC in the form of Intel HEX files. The flash control program processes the HEX files and creates the packets containing the updated code which are actually sent to the modem. Each packet contains a field containing the packet length, the address at which to store the updated code, the actual program data and a checksum. The boot control program running in the modem checks that the packet was correctly transmitted and programs the updated operating code at the address specified in the address field of the packet.

In summary, the flash control programs control the host PC side of the process of in-circuit reprogramming of flash PROM U7. The boot control program controls the modem side. As described above, flash PROM U7 is an in-circuit programmable and electrically erasable read only memory. As is well known to those of skill in the art, these memory chips allow in-circuit reprogramming of the operating code and parameters which are stored in the flash PROM chip U7. Although the present modem system is described with respect to a particular flash PROM U7, it shall be understood that any in-circuit reprogrammable memory configuration could be used without departing from the scope of the present invention.

Before flash PROM U7 is assembled in the modem circuit, the boot control program is burned, or programmed into flash PROM U7 using conventional PROM programmers and programming techniques.

When a bug fix, enhancement or other new release of system operating code becomes available, the flash control program is used to control the remote loading and processing of operating code downloaded over telephone line from a central bulletin board. The boot control program receives the updated code from the host PC over the serial port and controls in-circuit reprogramming of the new operating code into flash PROM U7.

The field programmable feature of the modem system of the present invention has several advantages. Because a user can remotely load new operating code over a remote telephone connection, code updates can be obtained immediately as soon as they are available instead of waiting for new parts to be shipped. In addition, no physical removal or replacement of parts is required thus significantly reducing the chance of breakages. Further, no special tools are required to remove and replace parts, and no special PROM programming equipment is required to reprogram the memory chips. Finally, the need for a technician to travel to the remote site to perform the upgrade is avoided thus significantly reducing costs associated with the upgrade.

Detailed descriptions of the flash control program and boot control program will now be given. The illustrative embodiments of the flash control program and boot control program described and shown herein is with special reference to a PC-based DOS operating system. It shall be understood, however, that the present invention is in no way limited to a DOS operating system. The preferred modem system can also be used with a UNIX-based operating system, MacIntosh operating system, or any of a number of operating system platforms simply by customizing the user interface to run on the desired operating system.

Detailed Description of Flash Control Program for a First Embodiment of the Present Invention The flash control program is used to control the reprogramming of updated operating code and parameters into the flash part of the modem.

Figure 7:
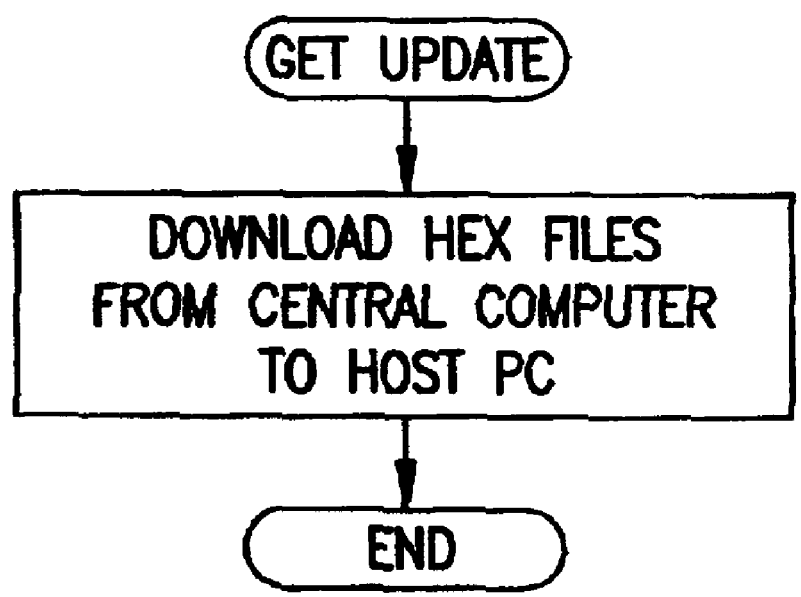
FIG. 7 shows a flow diagram of the process for downloading the HEX files containing the updated operating code from a bulletin board to the host PC in a first embodiment of the present invention.

The updated operating code is distributed to the user according to the procedure shown in FIG. 7. To get the update, HEX files containing the updated operating code are downloaded over a phone line from a computer bulletin board to the host PC. The HEX files are preferably in the Intel MCS-86 HEX format. This is an industry standard for HEX files.

The HEX files contain entirely ASCII characters and include three record types: Data Record, End Record and Extended Address Record. The formats of the three record types are described in detailed at page 27 of the User Manual for the Gtek EPROM programmer model 9000, dated Jan. 11, 1988, which is incorporated herein by reference, and are as follows (next page):

| Byte number | Contents |
|---|---|
| | Data Record |
| 1 | Colon(:) |
| 2–3 | Number of binary data bytes |
| 4–5 | Load address, high byte |
| 6–7 | Load address, low byte |
| 8–9 | Record type, must be "00" |
| 10–x | Data bytes, 2 ASCII-HEX characters |
| x+1–x+2 | Checksum, two ASCII-HEX characters |
| x+3–x+4 | carriage return (CR), line feed (LF) |
| | End Record |
| 1 | Colon(:) |
| 2–3 | Record length, must be "00" |
| 4–7 | Execution address |
| 8–9 | Record type, must be "01" |
| 10–11 | Checksum |
| 12–13 | CR,LF |
| | Extended Address Record |
| 1 | Colon(:) |
| 2–3 | Record length, should be "02" |
| 4–7 | Load address field, should be "0000" |
| 8–9 | Record type, must be "02" |
| 10–13 | USBA-this number multiplied by 16 is the new load offset address For our use only the first digit is used as the 64K bank offset value |
| 14–15 | Checksum |
| 16–17 | CR,LF |

Figure 8A:
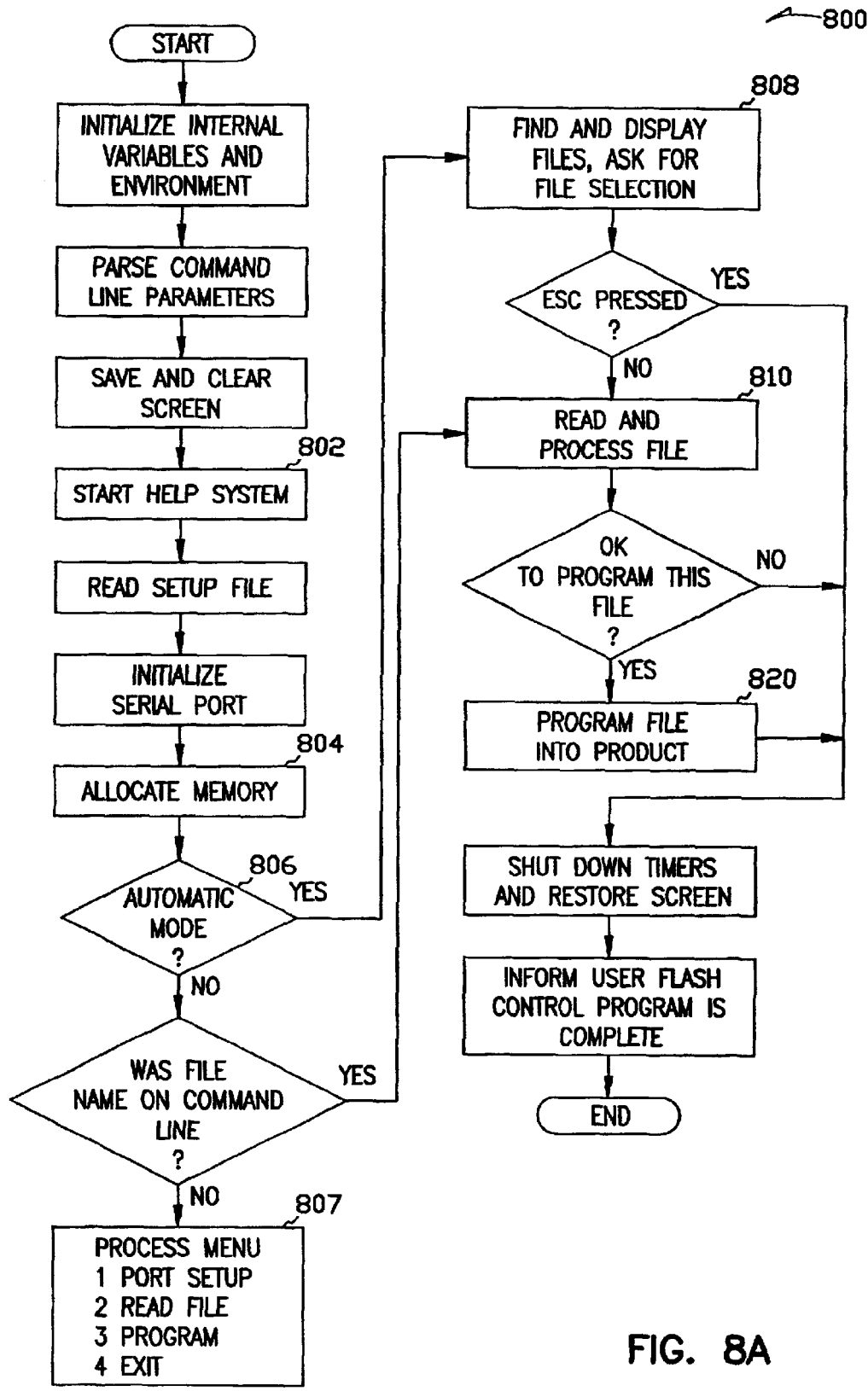
FIGS. 8A–8C show a flow diagram of the upgrade control program from the perspective of the host PC in a first embodiment of the present invention.

FIG. 8A shows a detailed flow diagram of the flash control program 800. The beginning of the flash control program 800 is shown. First, the internal environment and variables are initialized. The preferred flash control program 800 accepts either command line parameters or can be run in a menu driven mode. The present state of the user interface screen is saved and cleared while the field upgrade control program is running. The screen is saved for later restoration after the reprogramming is completed.

Flash control program 800 continues at control block 802, which starts the help system. The help system reports onscreen status messages to the user during various stages of reprogramming. At times information may be requested from the user. Also, error messages and possible courses of action are displayed when appropriate.

Next, flash control program 800 reads the setup file to determine which serial port the modem is connected through, the appropriate baud rate and other necessary setup information. The serial port is then initialized according to the setup information obtained.

Control block 804 allocates a 128 kbyte memory buffer in the host PC. This memory buffer is used to store processed HEX files containing the updated operating code to be programmed into the flash PROM in the modem. Processing of the HEX files is described in detail below with respect to FIG. 8B.

If "AUTOMATIC MODE" is set at query 806, flash control program 800 automatically runs the user through the reprogramming procedure. However for certain manufacturing and R&D purposes, it is desirable for the user to have more control over the reprogramming procedure. Thus, automatic mode can be disabled. When automatic mode is disabled, the flash control program checks whether the name of the HEX file to be programmed is present on the command line. If not, a user "PROCESS MENU" will appear on the screen at control block 807 with the choices "PORT SETUP," "READ FILE," "PROGRAM," or "EXIT." The user can then select the functions to be performed. If the HEX file name was on the command line, the flash control program continues with READ AND PROCESS FILE routine 810 described in detail below.

Otherwise, in AUTOMATIC MODE, flash control program 800 continues at the top right portion of FIG. 8A with control block 808. Here all HEX files present in the host PC are found and their names displayed onscreen. The user chooses the name of the file to be programmed into the modem. If the desired file is not listed, the user can press the ESC key to exit the program.

Although the bytes of each record in the HEX files downloaded from the bulletin board are sequential, the HEX records themselves are in no particular order within the file. The file must therefore be processed and sorted into a format which can be programmed into the modem. READ AND PROCESS FILE routine 810 reads the standard Intel HEX files stored in the host PC and performs the necessary HEX file processing.

Figure 8B:
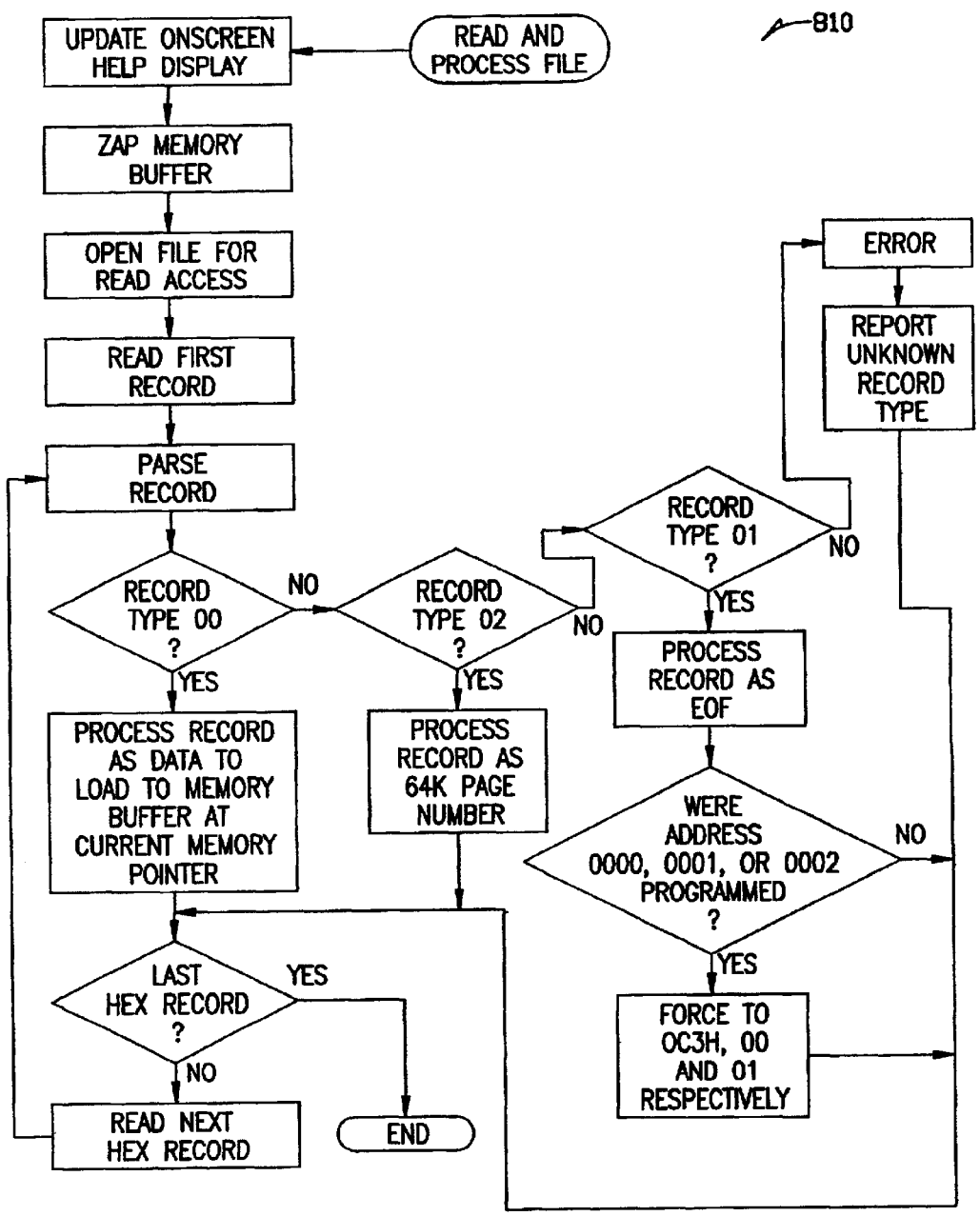

FIG. 8B shows a detailed flow diagram of the READ AND PROCESS FILE routine 810. The purpose of READ AND PROCESS FILE routine 810 is to convert the ASCII HEX characters contained in the HEX records to a binary format appropriate for programming into flash PROM U7. Routine 810 begins with an update of the onscreen help display. Next, the memory buffer is "zapped", i.e., set to all FF hex (all 1 binary). This corresponds to the erased state of flash PROM U7.

Next the HEX file is opened for read access and the first HEX record is read. The record is then parsed to check syntax and to determine the record type indicated by the record type field of each HEX record as described above.

If the record is type 0 the record is a data record. The record is processed as a data to be loaded in the memory buffer at the current memory pointer, where the pointer is the current 64 k page plus the address supplied in the record. After the data is converted from a ASCII text to binary and stored to the memory buffer, the pointer is incremented to the next available space in the buffer.

Record type 02 indicates an extended address record. The information in these records is converted from ASCII text to binary and processed as a 64 k page number to be added as an offset to all of the following records until a new record type 02 is reached.

Record type 01 indicates an End of File (EOF) record. If address 0000, 0001 or 0002 were programmed, these addresses are forced to 0c3h, 00 and 01, respectively. This is the code for a jump to boot control area, rather than the normal modem code. This step ensures that the boot control area of the flash part is not corrupted.

READ AND PROCESS FILE routine 810 reads through the records in the HEX file until all records have been read, processed and stored into the memory buffer in the host PC. After the last record has been processed, the READ AND PROCESS FILE routine 810 is completed.

Referring again to FIG. 8A, after READ AND PROCESS FILE routine 810 is completed, flash control program 800 queries the user ensure that the correct file to be programmed into the modem has been identified. If not, the program exits. Otherwise, flash control program 800 continues with PROGRAM FILE INTO PRODUCT routine 820.

Figure 8C:
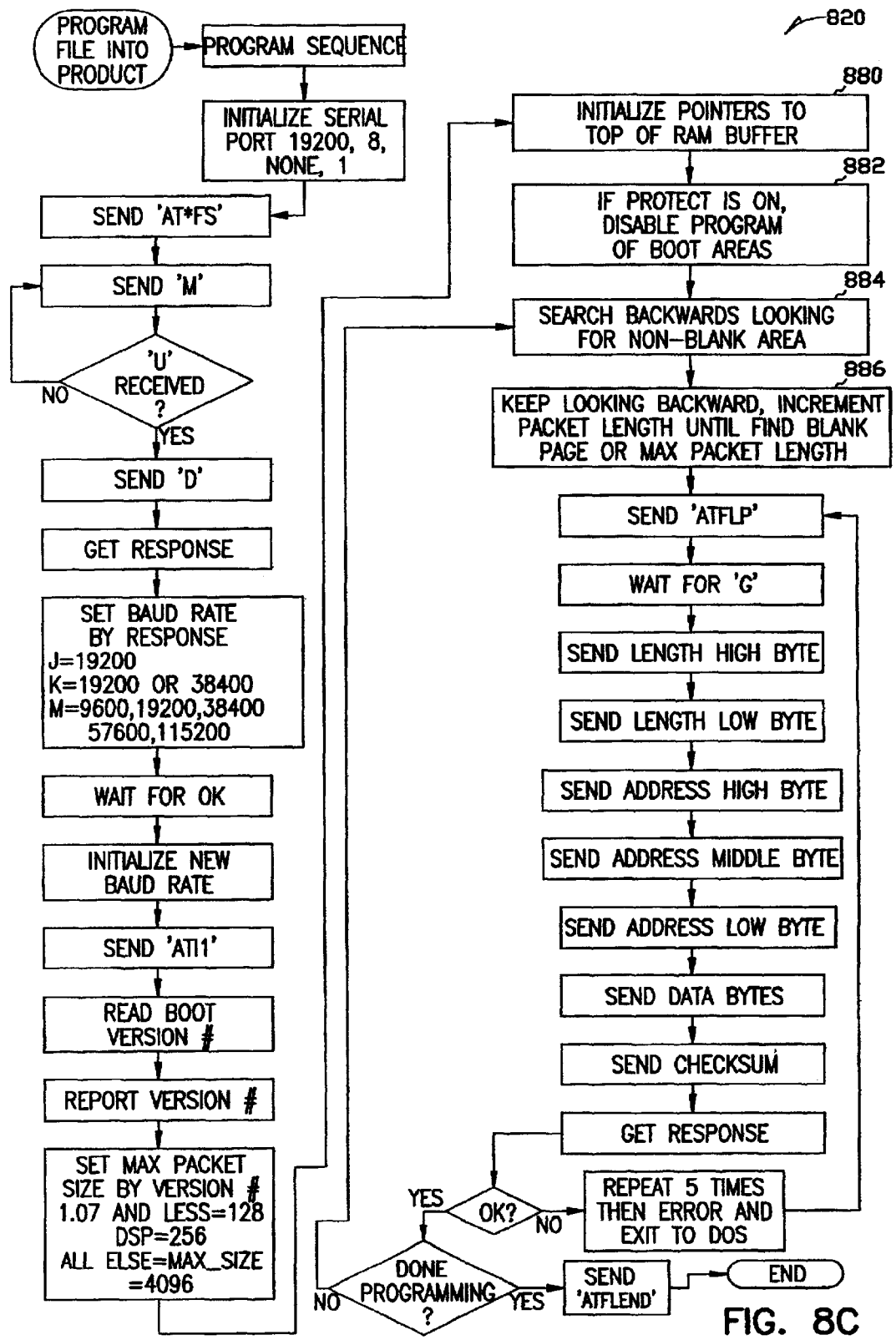

FIG. 8C shows a detailed flow diagram of PROGRAM FILE INTO PRODUCT routine 820. The present modem system uses the well-known and widely used AT command set. As is well-known in the art, the AT command set allows a user to control a modem by entering commands through a computer keyboard. The AT command set can be used to direct the modem to perform functions such as accessing a telephone line, taking the receiver off-hook, dialing and hanging up. The AT command set can also be used for more intelligent functions such as downloading or uploading files. Many of these more intelligent functions of the AT command set are used in the present modem system, as described in more detail below. The AT command set is used in the PROGRAM FILE INTO PRODUCT ROUTINE 820.

A general overview of the PROGRAM FILE INTO PRODUCT routine 820 will now be described with reference to Table 1 and Table 2. The handshaking procedure which negotiates the transfer baud rate between the host PC and modem, which was discussed above is shown in Table 1. The AT command set shown and described in Table 2 is used to control the modem. All data sent is 8 bits, no parity and 1 stop bit.

TABLE 1

| Host | Modem |
| --- | --- |
|  | Power up or AT*FS triggers execution of the boot code. |
| Send 'M's at 19200 baud | Responds with 'U' at 19200 baud if 'M's received within 30 ms of power up or AT*FS command. Otherwise jumps to main code on time out. |
| Send 'D' at 19200 baud | If 'D' received within 300 ms of when 'U' sent, then modem responds with 'J': can receive at 19200 baud 'K': can receive at 19.2k or 38.4k baud 'M': can receive at 9.6k, 19.2k, 38.4k, 57.6k or 115.2k baud. Otherwise jumps to main code on time out. |
| If 'J' then 19200 baud |  |

TABLE 1-continued

| Host | Modem |
| --- | --- |
|  | Otherwise may send 'I': 9600 baud 'J': 19200 baud 'K': 38.4k baud 'L': 57.6k baud 'M': 115.2k baud |
| Configure for negotiated speed. | Configure for negotiated speed. |

Referring now to FIG. 8C, the serial port is initialized to 19200 baud, and is set for packets of 8 bits, no parity and 1 stop bit. AT*FS is a special command which tells the modem to jump to address zero, which is equivalent to powering on the modem. At that point, the host PC and modem engage in a handshaking procedure to negotiate the transfer baud rate, shown in tabular form in Table 1 above. Pursuant to this handshaking procedure, the host PC starts sending capital 'M's to the modem at an initial baud rate of 19200. The host PC sends 'M's until it receives a 'U' response from the modem. Timeout is controlled by the modem side as described below with respect to FIG. 9A. The host PC continues to send 'M' at 19200 baud until a 'U' is received.

In the normal case, the modem will respond with a 'U' within 30 milliseconds. At that point, the PC will send back a 'D' and the modem responds within 300 ms with either 'J', 'K' or 'M', depending on the modem version and the corresponding baud rate at which it can run. If the modem responds with a 'J', the computer assumes a baud rate of 19200.

If the modem responds with a 'K', the computer can choose 38400 or 19200 baud. A response of 'M' means that the modem can be run at 9600, 19200, 38400, 57600 or 115.2 k baud. The PC sends I, J, K or M to set the speed. The host PC and modem then each initialize the negotiated baud rate and configure accordingly.

The modem is now prepared to receive the AT command set as shown in Table 2:

TABLE 2

| Command | Description |
| --- | --- |
| ATIx, where x=0, 1, 2, or 3 | special codes |
| ATFLEND | exit program and jump to main code |
| ATFLP | program a packet |

Next, the host PC sends an ATI1 command. The ATI1 command contains the boot control program version number. The version number determines the packet size, which can range from 128 bytes to 4 k byte packet size depending on the version number received. The host PC then sets the max packet size according to the version number received.

Next, as shown in control box 880 in the top right of FIG. 8C, the host PC initializes pointers to the top of the RAM buffer which was allocated in control box 804 shown on FIG. 8A, and in which the processed and sorted updated operating code to be programmed into the flash PROM in the modem is stored.

Once the pointers are initialized to the top of the RAM buffer in the host PC, control block 882 commands the PC to check a software protect switch which when enabled prevents overwriting of the program area of the flash PROM in which the boot control program is stored, or which when disabled allows portions of the boot control program to be updated. For normal use the software protect switch is enabled to prevent erroneous overwriting of the boot control program area. However, for R&D or manufacturing purposes it may be necessary to update or reprogram the boot control area. The software protect switch thus provides a software "back door" which allows access to the area of the flash PROM where the boot control program is stored.

Referring again to FIG. 8C, the host PC begins to build a packet which will be sent to the modem over the serial port. In the control blocks 884 and 886 the host PC builds a packet by searching through the HEX files in the RAM buffer, searching for contiguous non-blank pages. A HEX file blank page is defined as a page programmed to all FF. Whenever a non-blank page is found the packet length is incremented. Variable length packets may be sent in sizes up to the specified max packet length determined by version number as described above. Once a blank page is found or the max packet length is reached, the packet is complete and ready to be transferred to the modem over the RS232 serial port.

The packet built by the process shown in control blocks 884 and 886 includes a header portion and a data portion. The header portion includes a length field created by the host PC as it builds of the packet. The header portion also includes an address field which contains the physical starting address of where the data is to be placed in the flash PROM. The data portion includes the updated program data bytes and an XOR'd checksum. The packet format is shown in Table 3.

TABLE 3

| Packet Field | Field Length |
| --- | --- |
| Length High | 1 byte |
| Length Low | 1 byte |
| Address High | 1 byte (only lowest order 4 bits used, upper 4 bits set to 0) |
| Address Middle | 1 byte |
| Address Low | 1 byte |
| Program Data | x bytes |
| XOR'd checksum | 1 byte |

After the packet is built, the host PC sends the command ATFLP to the modem, the command for program a packet. Upon receipt of the ATFLP command, the modem responds with a 'G'. The host PC then transmits the data packet pointed to by the RAM buffer pointer.

After the packet is received by the modem, the modem generates its own checksum based on the data received and compares it to the checksum sent by the host PC. If they are equivalent, the modem responds with 'OK', and the received code is programmed into the flash PROM address pointed to by the Address High, Middle, and Low bytes. Otherwise the modem responds with an error.

The host PC will run through the programming loop, searching through the RAM buffer, creating packets and sending packets to the modem until the programming is complete or until 5 consecutive errors occur.

After the host PC has sent all the packets, as determined by the DONE PROGRAMMING query, the host PC sends an ATFLEND command to signal that programming is completed. After the file has been programmed, an exit routine, shown in FIG. 8A is run in which timers are shut down and the state of the screen is restored. The user is informed that the program is completed or was terminated due to error. The program then jumps to the normal modem code.

Figure 9A:
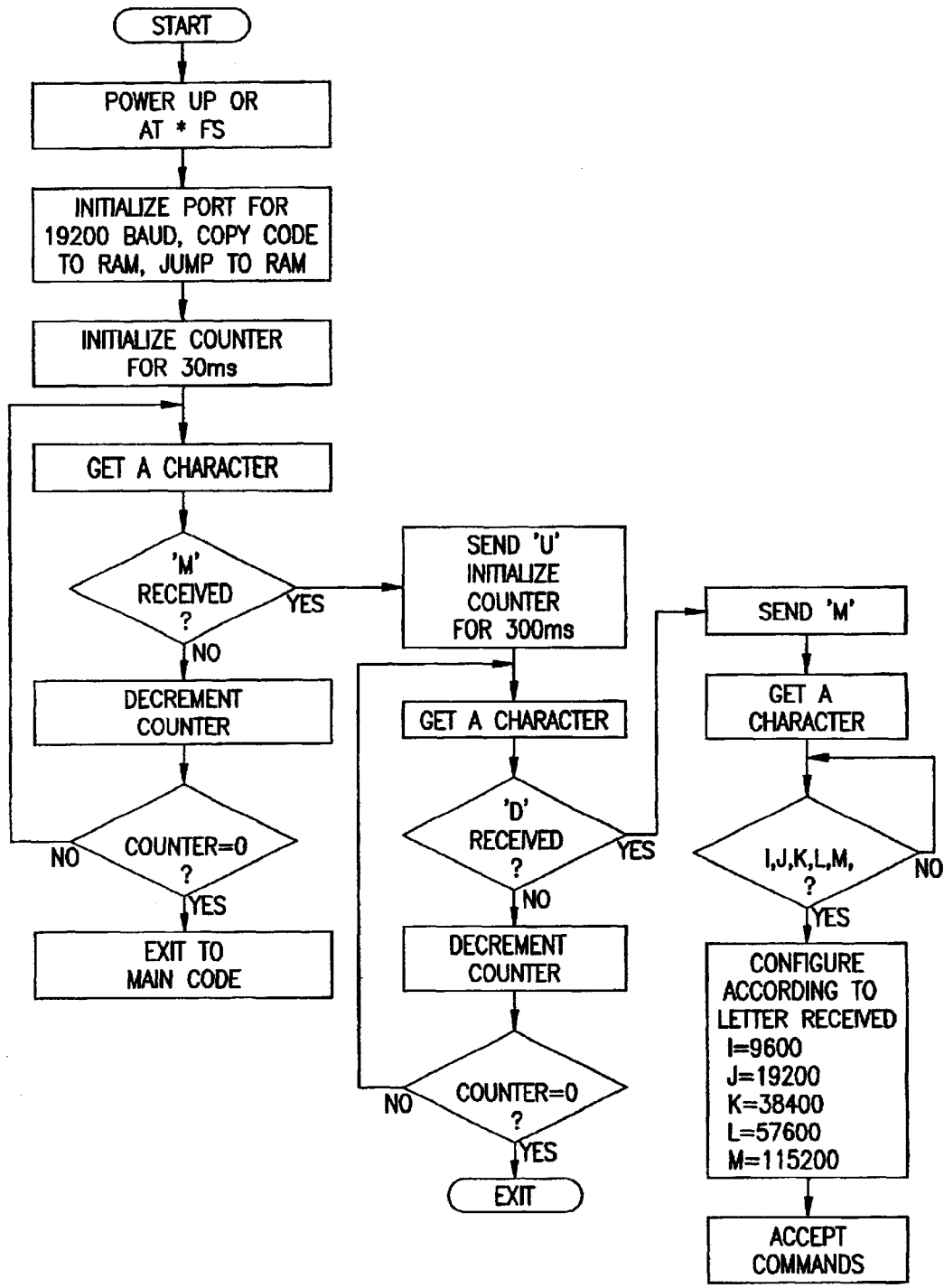
FIGS. 9A–9D show a flow diagram of the upgrade control program from the perspective of the modem in a first embodiment of the present invention.
Figure 9B:
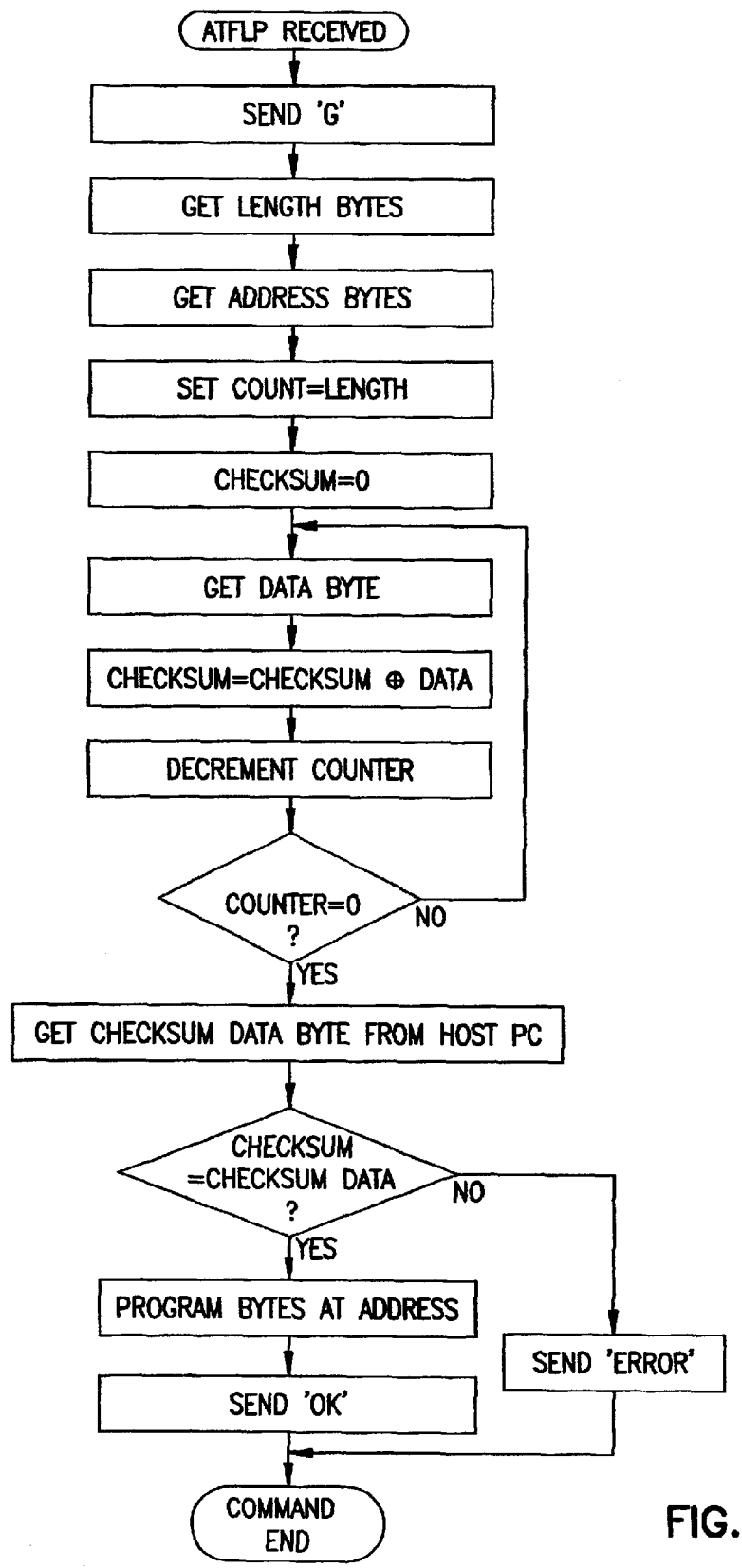

Detailed Description of the Boot Control Program for a First Embodiment of the Present Invention FIGS. 9A and 9B show a flow diagram of the boot control program. FIGS. 9A and 9B show the same programming procedure as described above with respect to FIGS. 8A–8C, except that FIGS. 8A–8C were described from the perspective of the host PC and FIGS. 9A and 9B are described from the perspective of the modem. The program begins with power up or AT*FS. The serial port between modem and host PC is initialized for 19200 baud. At this point the modem also copies the program code into RAM. The boot control program is run out of RAM while the flash PROM is reprogrammed. This is because certain bits in flash PROM U7 are toggled during reprogramming and therefore the boot control program must be copied to RAM to avoid corruption of the boot control code.

Next, the handshaking protocol described above with respect to FIG. 8C is performed. The modem initializes a counter for 30 milliseconds. If the modem receives an 'M' from the host PC, the modem responds with a 'U'. If no 'M' is received, the counter is decremented. The loop will timeout after 30 ms if no 'M' is received. The number of times through the loop is dependent on the crystal speed of the modem, but is equivalent to 30 milliseconds.

When the 'M' is received and the 'U' response is sent, another counter is initialized to 300 milliseconds. If a 'D' is received from the host PC within the 300 ms timeout, the modem responds with a 'J', 'K' or an 'M', depending of the baud rate at which the modem can run.

The host PC then sends either 'I', 'J', 'K', 'L' or M, and both the host PC and the modem configure their baud rates according to the negotiated speed.

Figure 9C:
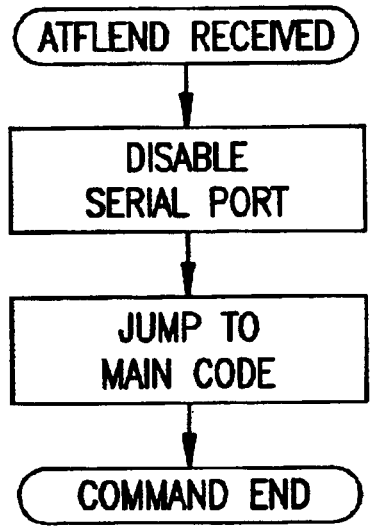
Figure 9D:
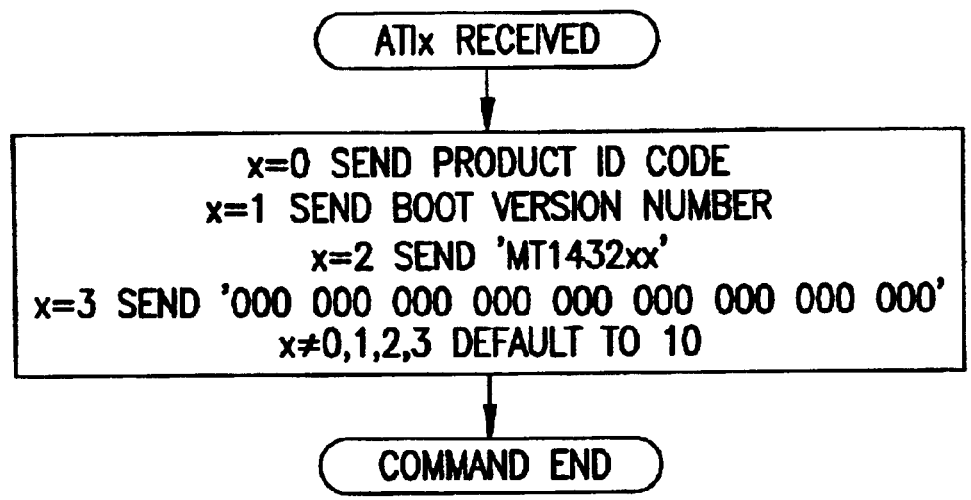

The AT commands ATFLP, ATFLEND or ATIx can now be received by the modem. Flow diagrams showing the programming procedures on receipt of these commands are shown in FIGS. 9B–9D.

FIG. 9B shows the control flow upon receipt of the ATFLP command. The modem first responds with a 'G' to indicate that the ATFLP command was received. Next, the packet length bytes and programming address bytes are received from the host PC. A counter is initialized to the length of a packet, and the checksum is initialized to 0.

The modem next runs through a loop, getting each data byte and calculating a new checksum by XOR'ing the checksum from the previous iteration through the loop with the data received. The modem continues through the loop, decrementing the counter each iteration until the count equals 0, indicating that the entire packet was received.

Next, the modem receives the checksum data byte which was generated by the host PC. If the checksum data byte generated by the host PC is equal to the checksum generated by the modem, the data bytes are programmed into the programming address sent with the packet into the flash PROM and an 'OK' response is sent to the host PC. If the checksums are not equal, an error message is sent to the host PC.

FIG. 9C shows the flow diagram for the ATFLEND command. As discussed above, the ATFLEND command occurs when programming of the flash PROM is completed. If the command ATFLEND is received, the serial port is disabled and a jump to the normal modem code is performed.

FIG. 9D shows other commands ATIx, where x=0, 1, 2 or 3. ATI0 commands the modem to respond with a product identification code. ATI1 commands the modem to respond with a boot version number, which is the version of the boot control program installed in the modem. The boot version number is important because different versions may require different packet lengths.

ATI2 is for identification of a basic modem or hardware platform. MT1432xx indicates a derivative of the basic MT1432 platform, for example. These could become more specific to facilitate a more intelligent host interface. ATI3 can be used to indicate country types, special defaults, or for future expansion of making a smarter PC host interface.

Functional Description of Upgrade Control Program for a Second Embodiment of the Modem System A second embodiment of the modem system also includes two control programs which control the remote in-circuit reprogramming of system firmware, a flash control program and a boot control program. However, in this embodiment the flash control program runs in the remote PC (i.e., the bulletin board) to process the updated operating code before downloading the code to the modem. The updated code is converted by a resident flash control program in the bulletin board from a PC Intel HEX file format into packets containing the updated code which are actually sent to the modem. Each packet contains a field containing the packet length, the address at which to store the updated code, the actual program data and a checksum. The boot control program running in the modem checks that the packet was correctly received and stores it until all packets are received. Reprogramming of flash PROM U7 begins after all packets are received.

In one embodiment of present invention addresses which are included in the received packets are stored in RAM circuit 216. These addresses are used to subsequently program the updated operating code into flash PROM U7.

In another embodiment of the present invention the modem organizes incoming packet data using the address information, rather than storing the address information. The address information is instantly used to store the packetized updated operating code in RAM circuit 216 in proper order. This order is a mirror image of the order in which flash PROM U7 will be programmed. This embodiment requires less RAM circuit 216 memory, since the address information need not be saved in the storage to RAM circuit 216.

In summary, the flash control programs control the bulletin board side of the process of in-circuit reprogramming of flash PROM U7. The boot control program controls the modem side. As described above, flash PROM U7 is an in-circuit programmable and electrically erasable read only memory. As is well known to those of skill in the art, these memory chips allow in-circuit reprogramming of the operating code and parameters which are stored in the flash PROM chip U7. Although the present modem system is described with respect to a particular flash PROM U7, it shall be understood that any in-circuit reprogrammable memory configuration could be used without departing from the scope of the present invention.

Before flash PROM U7 is assembled in the modem circuit, the boot control program is burned, or programmed into flash PROM U7 using conventional PROM programmers and programming techniques.

This embodiment of the present invention has several advantages. A direct programming of the Flash PROM circuit U7 is accomplished without the need to have the host PC process the files prior to programming the modem.

Detailed descriptions of the flash control program and boot control program will now be given. This embodiment of the present invention is not limited to a DOS operating system. The preferred modem system can also be used with a UNIX-based operating system, Macintosh operating system, or any of a number of operating system platforms simply by customizing the user interface to run on the desired operating system.

Detailed Description of Flash Control Program for a Second Embodiment of the Present Invention The flash control program is used to control the reprogramming of updated operating code and parameters into the flash part of the modem.

Figure 10:
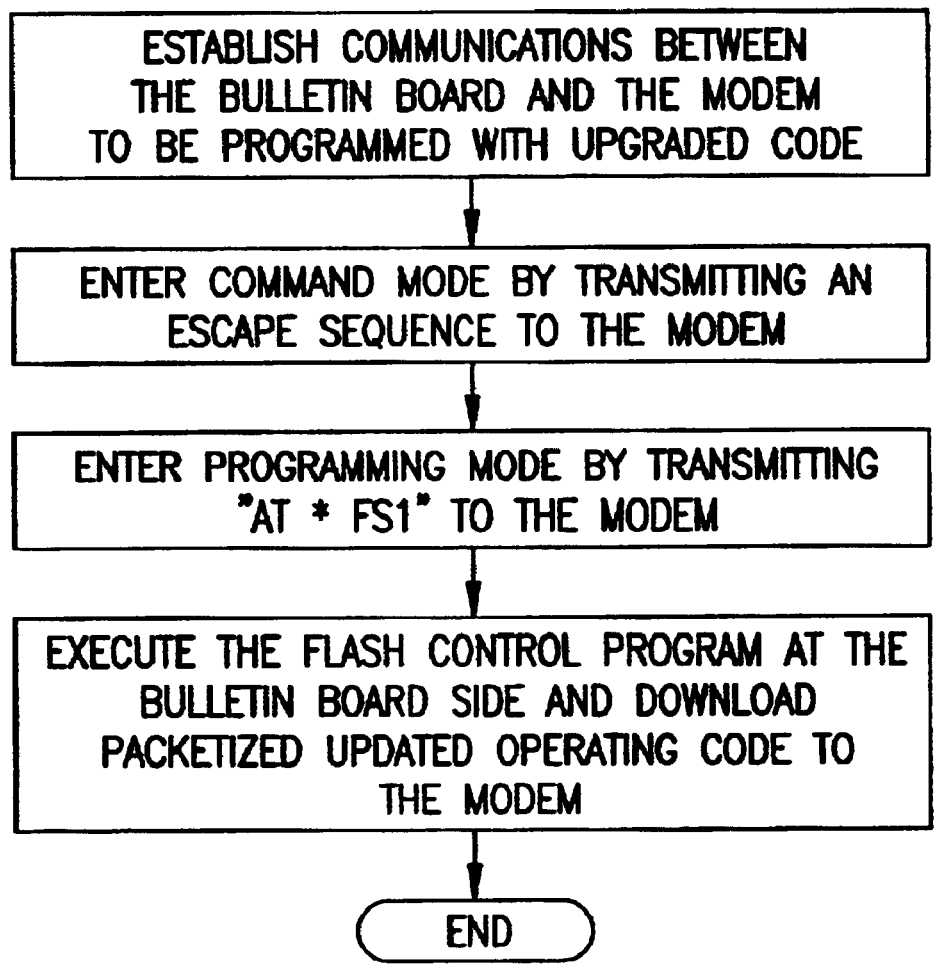
FIG. 10 shows a flow diagram of the process for directly downloading files containing updated operating code from a remote PC to the modem in a second embodiment of the present invention.

The updated operating code is distributed to the modem according to the procedure shown in FIG. 10. The updated operating code is resident on the Bulletin Board in the Intel MCS-86 HEX format. The HEX files may be converted using the flash control program every time a new modem is updated, or the HEX files may be converted once using the flash control program and downloaded every time a new modem is updated. The remote PC may be a bulletin board or another PC with modem access.

The HEX files were described in the section entitled "Detailed Description of Flash Control Program For a First Embodiment of the Present Invention", above.

Figure 11A:
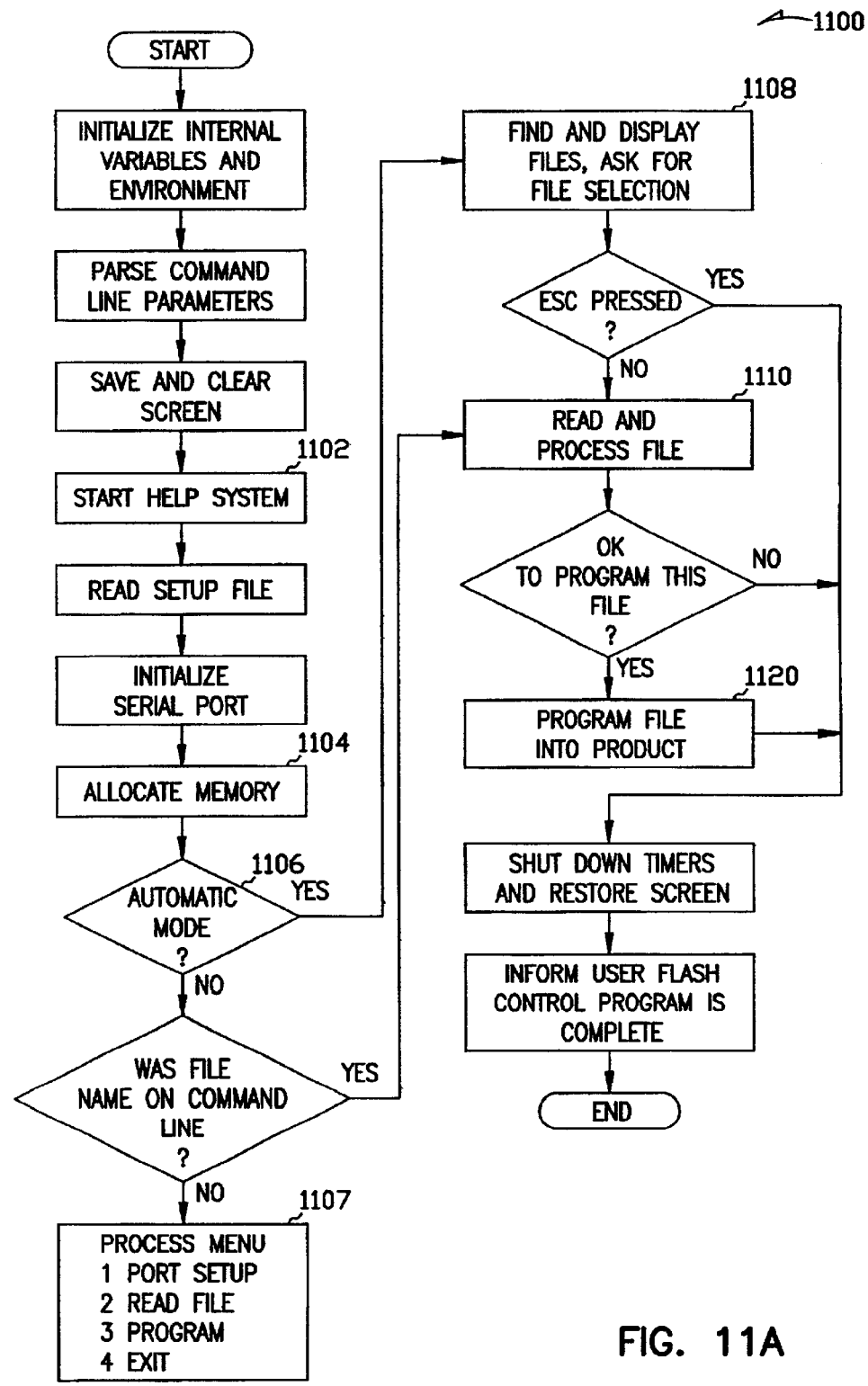
FIGS. 11A–11C show a flow diagram of the upgrade control program from the perspective of the remote PC in a second embodiment of the present invention.

FIG. 11A shows a detailed flow diagram of the flash control program 1100. First, the internal environment and variables are initialized. This embodiment of the flash control program 1100 accepts either command line parameters or can be run in a menu driven mode. The present state of the user interface screen is saved and cleared while the field upgrade control program is running. The screen is saved for later restoration after the reprogramming is completed.

Flash control program 1100 continues at control block 1102, which starts the help system. The help system reports onscreen status messages to the user (in this embodiment, the bulletin board operator) during various stages of reprogramming. At times information may be requested from the user. Also, error messages and possible courses of action are displayed when appropriate.

Next, flash control program 1100 reads the setup file to determine which serial port the modem is connected through, the appropriate baud rate and other necessary setup information. The serial port is then initialized according to the setup information obtained.

Control block 1104 allocates a 128 kbyte memory buffer in the remote PC (in this embodiment, the bulletin board PC). This memory buffer is used to store processed HEX files containing the updated operating code to be programmed into the flash PROM in the modem. Processing of the HEX files is described in detail below with respect to FIG. 11B.

If "AUTOMATIC MODE" is set at query 1106, flash control program 1100 automatically runs the user through the reprogramming procedure. However for certain manufacturing and R&D purposes, it is desirable for the user to have more control over the reprogramming procedure. Thus, automatic mode can be disabled. When automatic mode is disabled, the flash control program checks whether the name of the HEX file to be programmed is present on the command line. If not, a user "PROCESS MENU" will appear on the screen at control block 1107 with the choices "PORT SETUP," "READ FILE," "PROGRAM," or "EXIT." The user can then select the functions to be performed. If the HEX file name was on the command line, the flash control program continues with READ AND PROCESS FILE routine 1110 described in detail below.

Otherwise, in AUTOMATIC MODE, flash control program 1100 continues at the top right portion of FIG. 11A with control block 1108. Here all HEX files present in the remote PC are found and their names displayed onscreen. The user chooses the name of the file to be programmed into the modem. If the desired file is not listed, the user can press the ESC key to exit the program.

Although the bytes of each record in the HEX files are sequential, the HEX records themselves are in no particular order within the file. The file must therefore be processed and sorted into a format which can be programmed into the modem. READ AND PROCESS FILE routine 1110 reads the standard Intel HEX files stored in the remote PC and performs the necessary HEX file processing.

Figure 11B:
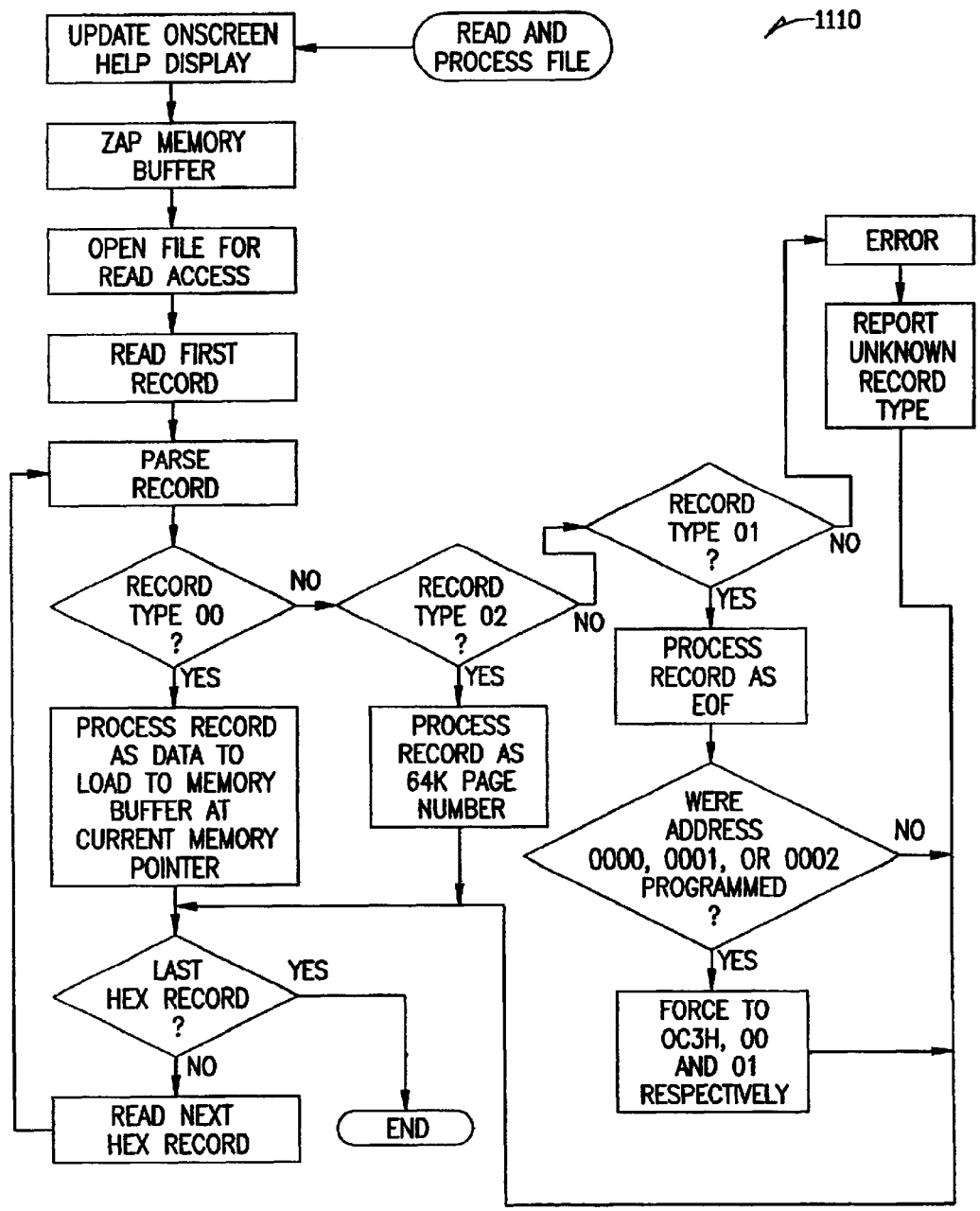

FIG. 11B shows a detailed flow diagram of the READ AND PROCESS FILE routine 1110. The purpose of READ AND PROCESS FILE routine 1110 is to convert the ASCII HEX characters contained in the HEX records to a binary format appropriate for programming into flash PROM U7. Routine 1110 begins with an update of the onscreen help display. Next, the memory buffer is "zapped", i.e., set to all FF hex (all 1 binary). This corresponds to the erased state of flash PROM U7.

Next the HEX file is opened for read access and the first HEX record is read. The record is then parsed to check syntax and to determine the record type indicated by the record type field of each HEX record as described above.

If the record is type 0 the record is a data record. The record is processed as a data to be loaded in the memory buffer at the current memory pointer, where the pointer is the current 64 k page plus the address supplied in the record. After the data is converted from a ASCII text to binary and stored to the memory buffer, the pointer is incremented to the next available space in the buffer.

Record type 02 indicates an extended address record. The information in these records is converted from ASCII text to binary and processed as a 64 k page number to be added as an offset to all of the following records until a new record type 02 is reached.

Record type 01 indicates an End of File (EOF) record. If address 0000, 0001 or 0002 were programmed, these addresses are forced to 0c3h, 00 and 01, respectively. This is the code for a jump to boot control area, rather than the normal modem code. This step ensures that the boot control area of the flash part is not corrupted.

READ AND PROCESS FILE routine 1110 reads through the records in the HEX file until all records have been read, processed and stored into the memory buffer in the remote PC. After the last record has been processed, the READ AND PROCESS FILE routine 810 is completed.

Referring again to FIG. 11A, after READ AND PROCESS FILE routine 1110 is completed, flash control program 1100 queries the user ensure that the correct file to be programmed into the modem has been identified. If not, the program exits. Otherwise, flash control program 1100 continues with PROGRAM FILE INTO PRODUCT routine 1120.

Figure 11C:
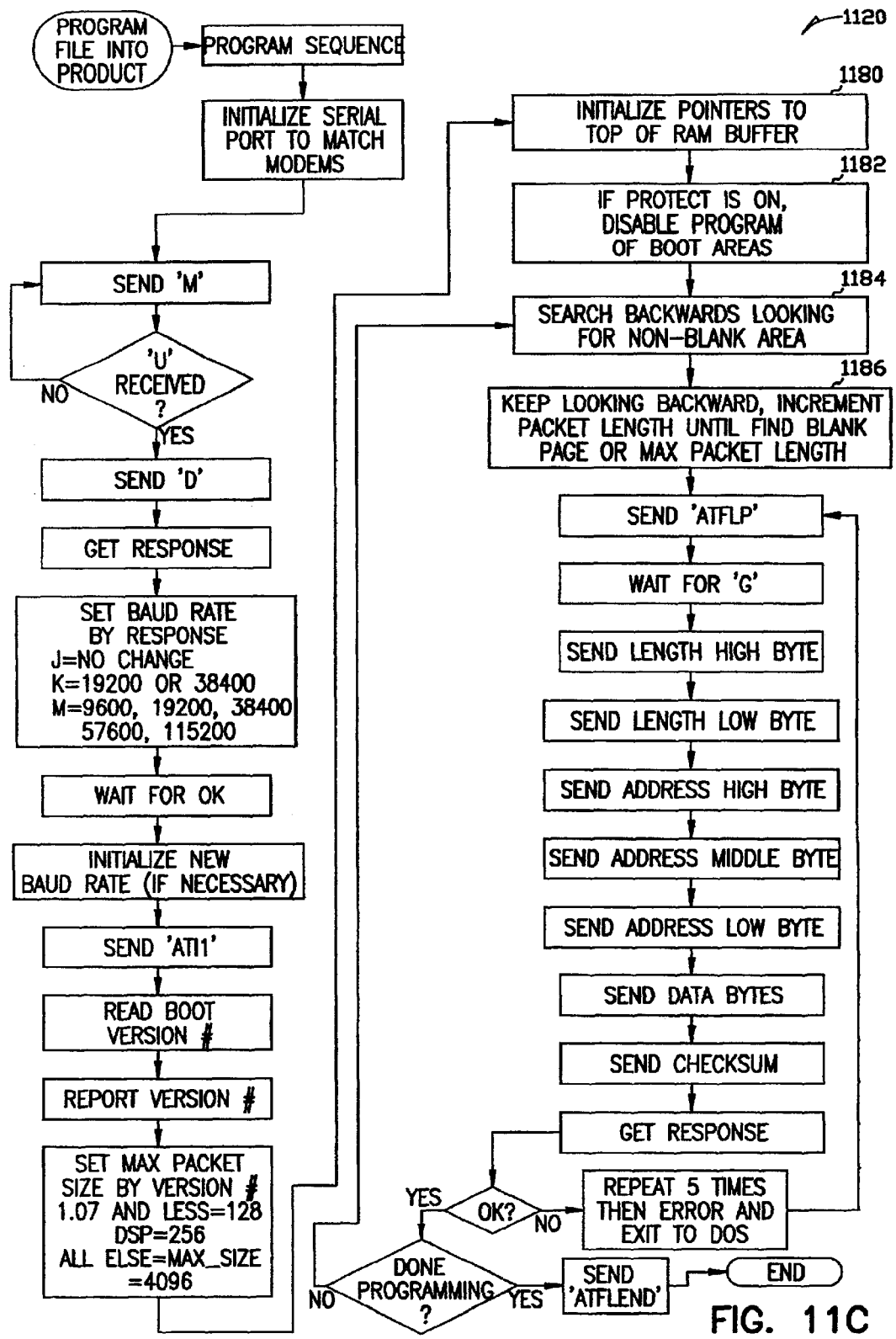

FIG. 11C shows a detailed flow diagram of PROGRAM FILE INTO PRODUCT routine 1120.

A general overview of the PROGRAM FILE INTO PRODUCT routine 1120 will now be described with reference to Table 4 and Table 5. The handshaking procedure which negotiates the transfer baud rate between the remote PC and modem, which was discussed above is shown in Table 4 (next page). The AT command set shown and described in Table 5 is used to control the modem. All data sent is 8 bits, no parity and 1 stop bit.

TABLE 4

| Remote PC | Modem |
| --- | --- |
|  | AT*FS1 triggers execution of the boot code. |
| Send 'M's at current speed | Responds with 'U' at current speed if 'M's received within a time adequate for the Remote PC to enter command mode and process a file per the AT*FS1 command. Otherwise jumps to main code on time out. |
| Send 'D' at current speed | If 'D' received within 300 ms of when 'U' sent, then modem responds with 'J': can receive at current speed 'K': can receive at 19.2k or 38.4k baud 'M': can receive at 9.6k, 19.2k, 38.4k, 57.6k or 115.2k baud. Otherwise jumps to main code on time out. |
| If 'J' then current speed Otherwise may send 'I': 9600 baud 'J': 19200 baud 'K': 38.4k baud 'L': 57.6k baud 'M': 115.2k baud |  |
| Configure for negotiated speed. | Configure for negotiated speed. |

Referring now to FIG. 11C, the serial port is initialized at the remote PC to match the transmission parameters (baud rate, packet size, stop bits) of the modem receiving the upgraded operating code. The modems establish the transmission parameters when first communicating in the data mode (see the first step of FIG. 10). The modems have a default baud rate of 19200 baud, if no other speed is established. The remote PC and modem engage in a handshaking procedure to negotiate the transfer baud rate, shown in tabular form in Table 4 above. Pursuant to this handshaking procedure, the remote PC starts sending capital 'M's to the modem at the baud rate established between the remote PC modem and the modem receiving the updated operating code. The remote PC sends 'M's until it receives a 'U' in response from the modem. Timeout is controlled by the modem side as described below with respect to FIG. 12A. The remote PC continues to send 'M' at the established baud rate until a 'U' is received.

In the normal case, the modem will respond with a 'U' within 30 milliseconds. At that point, the PC will send back a 'D' and the modem responds within 300 ms with either 'J', 'K' or 'M', depending on the modem version and the corresponding baud rate at which it can run. If the modem responds with a 'J', the computer assumes that no change in speed is necessary.

If the modem responds with a 'K', the computer can choose 38400 or 19200 baud. A response of 'M' means that the modem can be run at 9600, 19200, 38400, 57600 or 115.2 k baud. The PC sends I, J, K or M to set the speed. The remote PC and modem then each initialize the negotiated baud rate and configure accordingly.

The modem is now prepared to receive the AT command set as shown in Table 5:

TABLE 5

| Command | Description |
| --- | --- |
| ATIx, where x=0, 1, 2, or 3 | special codes |
| ATFLEND | program flash PROM U7 and then hard boot |
| ATFLP | transmit a packet |

Next, the remote PC sends an ATI1 command. The ATI1 command contains the boot control program version number. The version number determines the packet size, which can range from 128 bytes to 4 k byte packet size depending on the version number received. The remote PC then sets the max packet size according to the version number received.

Next, as shown in control box 1180 in the top right of FIG. 11C, the remote PC initializes pointers to the top of the RAM buffer which was allocated in control box 1104 shown on FIG. 11A, and in which the processed and sorted updated operating code to be programmed into the flash PROM in the modem is stored.

Once the pointers are initialized to the top of the RAM buffer in the remote PC, control block 1182 commands the PC to check a software protect switch which when enabled prevents overwriting of the program area of the flash PROM in which the boot control program is stored, or which when disabled allows portions of the boot control program to be updated. For normal use the software protect switch is enabled to prevent erroneous overwriting of the boot control program area. However, for R&D or manufacturing purposes it may be necessary to update or reprogram the boot control area. The software protect switch thus provides a software "back door" which allows access to the area of the flash PROM where the boot control program is stored.

Referring again to FIG. 11C, the remote PC begins to build a packet which will be sent to the modem over the serial port. In the control blocks 1184 and 1186 the remote PC builds a packet by searching through the HEX files in the RAM buffer, searching for contiguous non-blank pages. A HEX file blank page is defined as a page programmed to all FF. Whenever a non-blank page is found the packet length is incremented. Variable length packets may be sent in sizes up to the specified max packet length determined by version number as described above. Once a blank page is found or the max packet length is reached, the packet is complete and ready to be transferred to the modem.

The packet built by the process shown in control blocks 1184 and 1186 includes a header portion and a data portion. The header portion includes a length field created by the remote PC as it builds the packet. The header portion also includes an address field which contains the physical starting address of where the data is to be placed in the flash PROM. The data portion includes the updated program data bytes and an XOR'd checksum. The packet format is shown in Table 6:

TABLE 6

| Packet Field | Field Length |
| --- | --- |
| Length High | 1 byte |
| Length Low | 1 byte |
| Address High | 1 byte (only lowest order 4 bits used, upper 4 bits set to 0) |
| Address Middle | 1 byte |
| Address Low | 1 byte |
| Program Data | x bytes |
| XOR'd checksum | 1 byte |

After the packet is built, the remote PC sends the command ATFLP to the modem, the command for program a packet. Upon receipt of the ATFLP command, the modem responds with a 'G'. The remote PC then transmits the data packet pointed to by the RAM buffer pointer.

After the packet is received by the modem, the modem generates its own checksum based on the data received and compares it to the checksum sent by the remote PC. If they are equivalent, the modem responds with 'OK', and the received code is stored in RAM circuit 216. In one embodiment the received code is stored in an order determined by the received Address High, Middle and Low bytes accompanying the received code. In an alternate embodiment the flash PROM address of the Address High, Middle, and Low bytes is stored as well. After the entire updated operating code is transferred to RAM circuit 216 the remote PC sends an ATFLEND command to initiate programming of the flash PROM U7, as described below. Otherwise the modem responds with an error.

The remote PC will run through the programming loop, searching through the RAM buffer, creating packets and sending packets to the modem until the programming is complete or until 5 consecutive errors occur.

After the remote PC has sent all the packets, as determined by the DONE PROGRAMMING query, the remote PC sends an ATFLEND command to signal that RAM 216 has the entire updated operating code. After the file has been programmed, an exit routine, shown in FIG. 11A is run in which timers are shut down and the state of the screen is restored. The user is informed that the program is completed or was terminated due to error. The program then terminates.

Figure 12A:
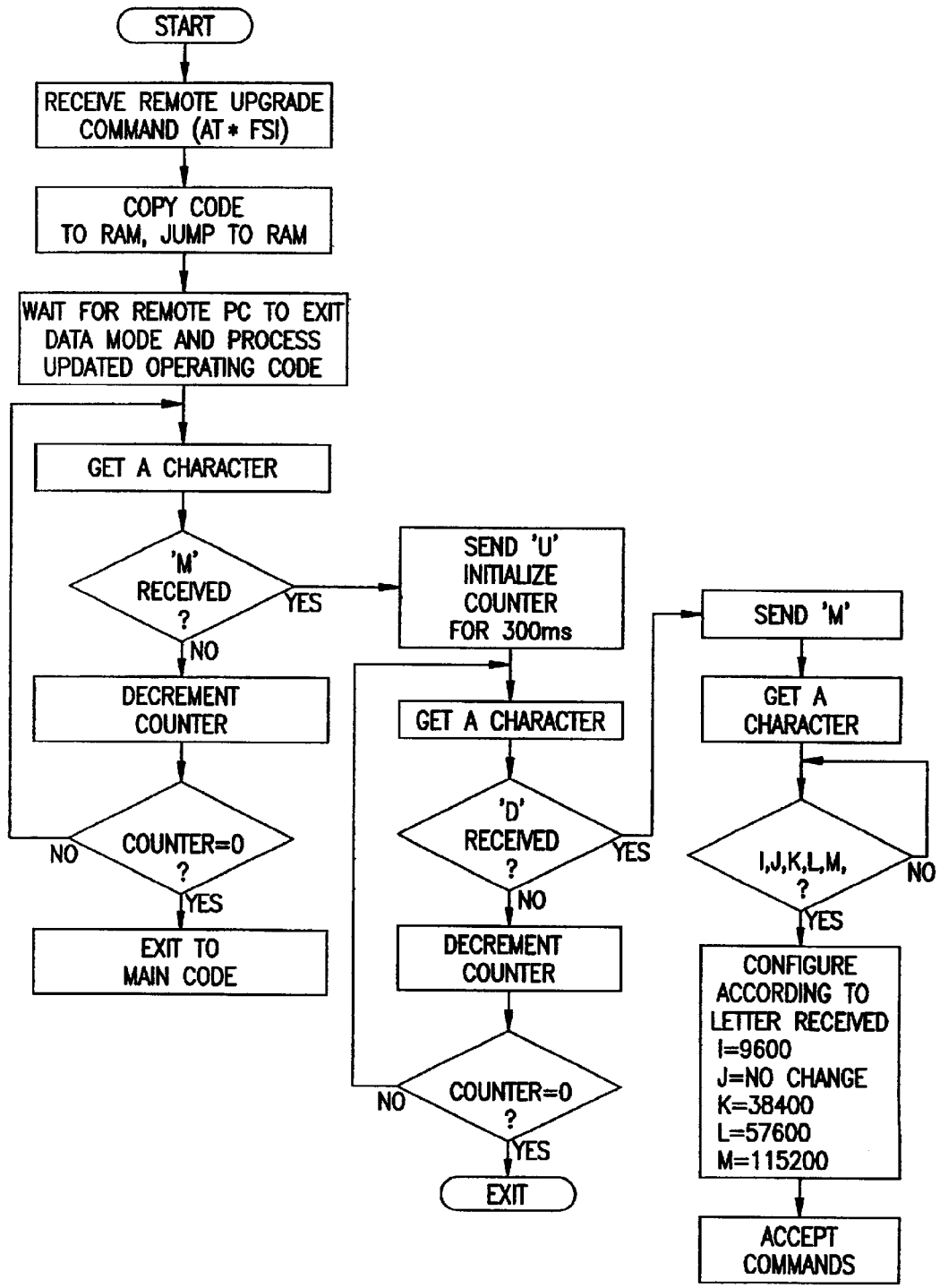
FIGS. 12A–12D show a flow diagram of the upgrade control program from the perspective of the modem in a second embodiment of the present invention.
Figure 12B:
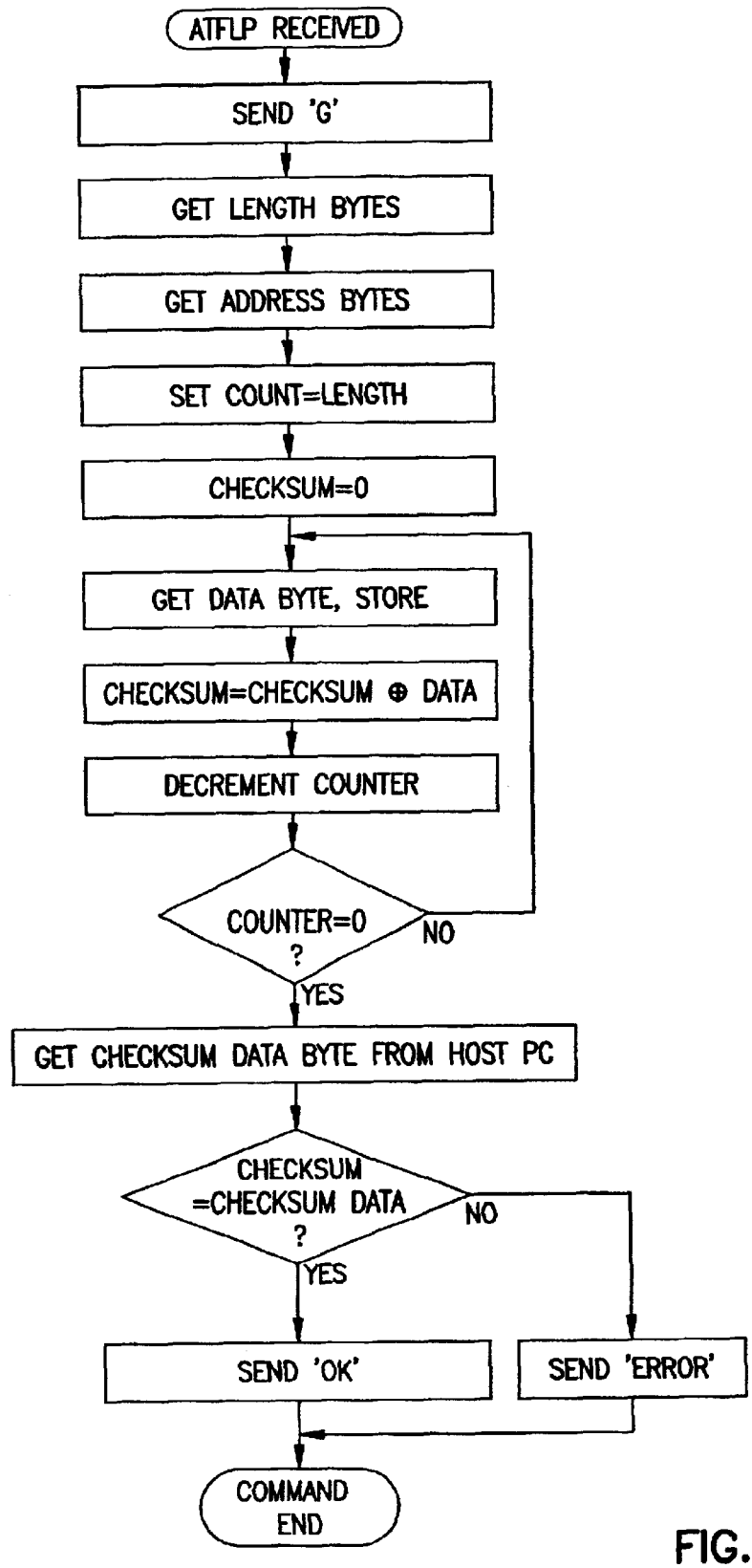

Detailed Description of the Boot Control Program for a Second Embodiment of the Present Invention FIGS. 12A and 12B show a flow diagram of the boot control program, described from the perspective of the modem. The program begins upon reception of the upgrade command AT*FS1. At this point the modem copies the program code into RAM. The boot control program is run out of RAM while the flash PROM is reprogrammed. This is because certain bits in flash PROM U7 are toggled during reprogramming and therefore the boot control program must be copied to RAM to avoid corruption of the boot control code.

Next, the handshaking protocol described above with respect to the flash control program is performed. The modem waits for the remote PC to exit data communications software and process the upgrade file (if updated operating programs are not already preprocessed and ready at the remote PC location). If the modem receives an 'M' from the remote PC, the modem responds with a 'U'. If no 'M' is received, the counter is decremented. The loop will timeout after a time adequate for the Remote PC to enter command mode and process a file per the AT*FS1 command if no 'M' is received. The number of times through the loop is dependent on the crystal speed of the modem, but depends on a time adequate for the Remote PC to enter command mode and process a file per the AT*FS1 command.

When the 'M' is received and the 'U' response is sent, another counter is initialized to 300 milliseconds. If a 'D' is received from the remote PC within the 300 ms timeout, the modem responds with a 'J', 'K' or an 'M', depending of the baud rate at which the modem can run.

The remote PC then sends either 'I', 'J', 'K', 'L' or M, and both the remote PC and the modem configure their baud rates according to the negotiated speed.

Figure 12C:
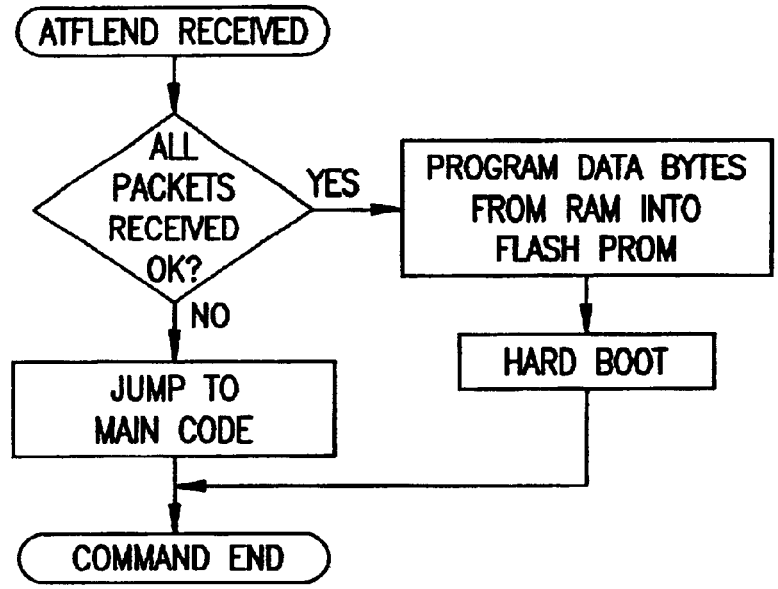
Figure 12D:
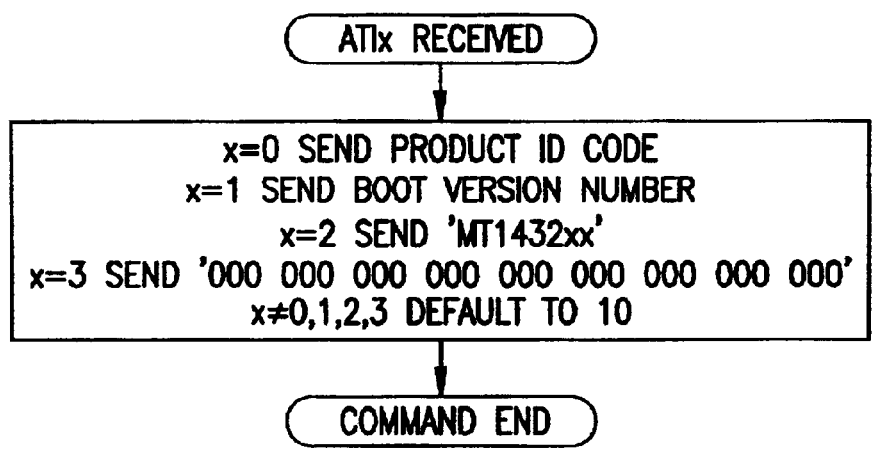

The AT commands ATFLP, ATFLEND or ATIx can now be received by the modem. Flow diagrams showing the programming procedures on receipt of these commands are shown in FIGS. 12B–12D.

FIG. 12B shows the control flow upon receipt of the ATFLP command. The modem first responds with a 'G' to indicate that the ATFLP command was received. Next, the packet length bytes and programming address bytes are received from the remote PC. A counter is initialized to the length of a packet, and the checksum is initialized to 0.

The modem next runs through a loop, getting each data byte and calculating a new checksum by XOR'ing the checksum from the previous iteration through the loop with the data received. In one embodiment, the data bytes are collected in RAM circuit 216, as described below. Other embodiments may allow the bytes to be programmed directly to flash PROM 217 if large enough to accommodate two sets of operating code. That way, the functioning of the modem is not compromised by a failed updated code programming attempt. The modem continues through the loop, decrementing the counter each iteration until the count equals 0, indicating that the entire packet was received.

Next, the modem receives the checksum data byte which was generated by the remote PC. If the checksum data byte generated by the remote PC is equal to the checksum generated by the modem, the data bytes are stored into RAM circuit 216 according to the programming address sent with the packet and an 'OK' response is sent to the remote PC. If the checksums are not equal, an error message is sent to the remote PC.

FIG. 12C shows the flow diagram for the ATFLEND command. As discussed above, the ATFLEND command occurs when RAM circuit 216 contains the entire updated operating code. If the command ATFLEND is received and all packets are received without error, the serial port is disabled and flash PROM U7 is programmed with the entire updated operating code stored in RAM circuit 216. A hard boot of the modem is performed and the modem executes the updated operating code. If the transfer has errors, the modem begins executing the normal modem code without updating flash PROM U7.

FIG. 12D shows other commands ATIx, where x=0, 1, 2 or 3. ATI0 commands the modem to respond with a product identification code. ATI1 commands the modem to respond with a boot version number, which is the version of the boot control program installed in the modem. The boot version number is important because different versions may require different packet lengths.

ATI2 is for identification of a basic modem or hardware platform. MT1432xx indicates a derivative of the basic MT1432 platform, for example. These could become more specific to facilitate a more intelligent remote interface. ATI3 can be used to indicate country types, special defaults, or for future expansion of making a smarter PC remote interface.

CONCLUSION

The two embodiments described were given to demonstrate two embodiments of the present invention. Other embodiments are possible which do not deviate from the scope and spirit of the present invention. For example, other embodiments may incorporate different handshaking symbols and procedures without departing from the scope and spirit of the teaching of the present invention.

Although specific embodiments have been illustrated and described herein, it will be appreciated by those of ordinary skill in the art that any system which is calculated to achieve the same purpose may be substituted for the specific embodiments shown. These applications are intended to cover any adaptations or variations of the present invention.

Therefore, it is manifestly intended that this invention be limited only by the claims and equivalents thereof.

We claim:

1. An apparatus comprising:
    an interface adapted to couple with a communication network;
    a controller coupled to the interface;
    a boot program executable by the controller;
    a first operating code to control the apparatus;
    a first memory coupled to the controller and adapted to store the boot program and the first operating code; and
    a second memory coupled to the controller, the controller operable for executing the boot program to receive a plurality of packets from a remote computer coupled to the communication network and to check the validity of each packet of the plurality of packets and to store a portion of each packet in a second memory coupled to the controller, and after receiving an upgrade command from the remote computer and after checking the validity, to replace the first operating code with a second operating code based on the portion of each packet stored in the second memory.

2. The apparatus of claim 1 further comprising a serial line interface coupled to the controller and adapted to couple with a local computer.

3. The apparatus of claim 1 wherein the interface includes a telephone line coupler.

4. The apparatus of claim 1 further comprising a data pump coupled to the controller.

5. The apparatus of claim 1 wherein the second memory includes random access memory (RAM).

6. The apparatus of claim 1 wherein the first memory includes programmable read only memory (PROM).

7. The apparatus of claim 1 further comprising a modem adapted for communicating with the remote computer.

8. A method comprising:
    coupling a modem to a communication network;
    executing a boot program of the modem;
    executing a first operating code for the modem stored in a first memory of the modem based on an instruction executed by the boot program;
    receiving a plurality of packets via the communication network;
    checking validity of each packet of the plurality of packets;
    storing a portion of each packet of the plurality of packets in a second memory of the modem; and
    after receiving an upgrade command via the communication network replacing the first operating code in the first memory with a second operating code based on the portion of each packet of the plurality of packets stored in the second memory.

9. The method of claim 8 further comprising executing the boot program after replacing the first operating code in the first memory with the second operating code.

10. The method of claim 8 wherein storing the portion of each packet of the plurality of packets in the second memory includes storing the portion in a location of the second memory based on an address of each packet.

11. The method of claim 8 further comprising copying the boot program to a random access memory.

12. The method of claim 8 wherein checking validity includes checking for errors.

13. The method of claim 8 further comprising generating a local checksum data byte at the modem.

14. The method of claim 13 further comprising receiving a remote checksum via the communication network and comparing the local checksum and the remote checksum.

15. The method of claim 8 further comprising executing a hard boot of the modem.

16. The method of claim 15 wherein executing the hard boot of the modem includes executing the second operating code.

17. The method of claim 8 wherein receiving the plurality of packets includes receiving a plurality of packets each packet having a field containing a packet length and a checksum.

18. A method comprising:

executing a first operating code stored in a first memory;

receiving a plurality of packets via a communication network, each packet having an address field having an address and an operating code field having a portion of program data;

checking each packet of the plurality of packets for validity;

for each packet, storing the portion of program data of the packet at an address of a second memory based on the address of the packet; and after receiving an upgrade command via the communication network, replacing the first operating code in the first memory with a second operating code based on the program data stored in the second memory.

19. The method of claim 18 wherein checking each packet of the plurality of packets for validity includes comparing a checksum.

20. The method of claim 18 further comprising executing the first operating code if a packet of the plurality of packets includes an error.

21. The method of claim 18 wherein replacing the first operating code in the first memory with the second operating code includes reprogramming a flash programmable read only memory (PROM).

* * * * *